United States Patent [19]

Kurita et al.

[11] Patent Number: 4,883,592
[45] Date of Patent: Nov. 28, 1989

[54] FILTER PRESS

[75] Inventors: Tetsuya Kurita, Takarazuka; Atsushi Takashima, Kobe; Katsutami Shibasaki, Osaka, all of Japan

[73] Assignee: Kurita Machinery Manufacturing Co., Ltd., Osaka, Japan

[21] Appl. No.: 90,668

[22] Filed: Aug. 28, 1987

[30] Foreign Application Priority Data

| Sep. 3, 1986 | [JP] | Japan | 61-208390 |
| Sep. 6, 1986 | [JP] | Japan | 61-210007 |
| Sep. 25, 1986 | [JP] | Japan | 61-227536 |
| Sep. 25, 1986 | [JP] | Japan | 61-227537 |
| Dec. 9, 1986 | [JP] | Japan | 61-293691 |
| Feb. 14, 1987 | [JP] | Japan | 62-31908 |
| Apr. 4, 1987 | [JP] | Japan | 62-83344 |

[51] Int. Cl.$^4$ .......................................... B01D 25/12
[52] U.S. Cl. .................................... 210/227; 100/197; 210/231
[58] Field of Search .............. 210/224, 225, 227, 228, 210/231; 100/113, 115, 196, 197

[56] References Cited

U.S. PATENT DOCUMENTS

| 1,863,071 | 6/1932 | Smith et al. | 210/224 |
| 2,006,131 | 6/1935 | Crawley | 210/226 |
| 3,241,678 | 3/1966 | Wrotnowski | 210/231 |
| 3,620,374 | 11/1971 | Brinkema | 210/231 |
| 3,957,645 | 5/1976 | Kurita et al. | 210/231 |
| 4,491,519 | 1/1985 | Kurita | 210/225 |
| 4,565,637 | 1/1986 | Pearce | 210/231 |

FOREIGN PATENT DOCUMENTS

| 2238323 | 2/1974 | Fed. Rep. of Germany . |
| 2603505 | 8/1977 | Fed. Rep. of Germany . |
| 2621245 | 11/1977 | Fed. Rep. of Germany . |
| 481687 | 1/1917 | France . |
| 1322618 | 2/1963 | France . |
| 85008 | 4/1965 | France . |
| 2227032 | 11/1974 | France . |
| 2384526 | 10/1978 | France . |
| WO86/07282 | 12/1986 | France . |
| 44-31036 | 12/1944 | Japan . |
| 59-13508 | 7/1959 | Japan . |
| 50-107567 | 8/1975 | Japan . |
| 50-110156 | 8/1975 | Japan . |
| 51-39460 | 4/1976 | Japan . |
| 52-139579 | 10/1977 | Japan . |
| 55-35048 | 8/1980 | Japan . |
| 57-37369 | 8/1982 | Japan . |
| 57-58969 | 12/1982 | Japan . |
| 57-60883 | 12/1982 | Japan . |
| 58-2409 | 1/1983 | Japan . |
| 59-39445 | 11/1984 | Japan . |
| 61-22654 | 7/1986 | Japan . |
| 61-163010 | 10/1986 | Japan . |
| 1118383 | 7/1968 | United Kingdom . |
| WO87/01300 | 3/1987 | World Int. Prop. O. .......... 210/231 |

Primary Examiner—W. Gary Jones
Attorney, Agent, or Firm—Wenderoth, Lind & Ponack

[57] ABSTRACT

The present invention relates to a filter press. The filter press includes a plurality of filter plates each of which comprises a filter frame having a space therein. The filter plate has a simple construction, providing the effect of reducing the weight of a filter press as a whole and protecting a filter press from damage by the filtering compression.

7 Claims, 24 Drawing Sheets

Fig. 52
Fig. 53
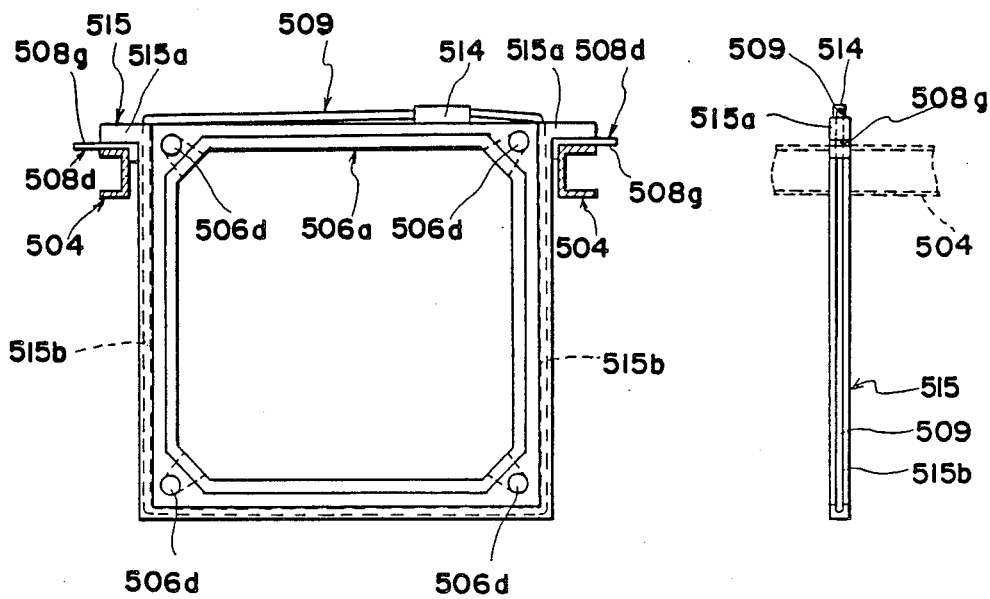
Fig. 54
Fig. 55
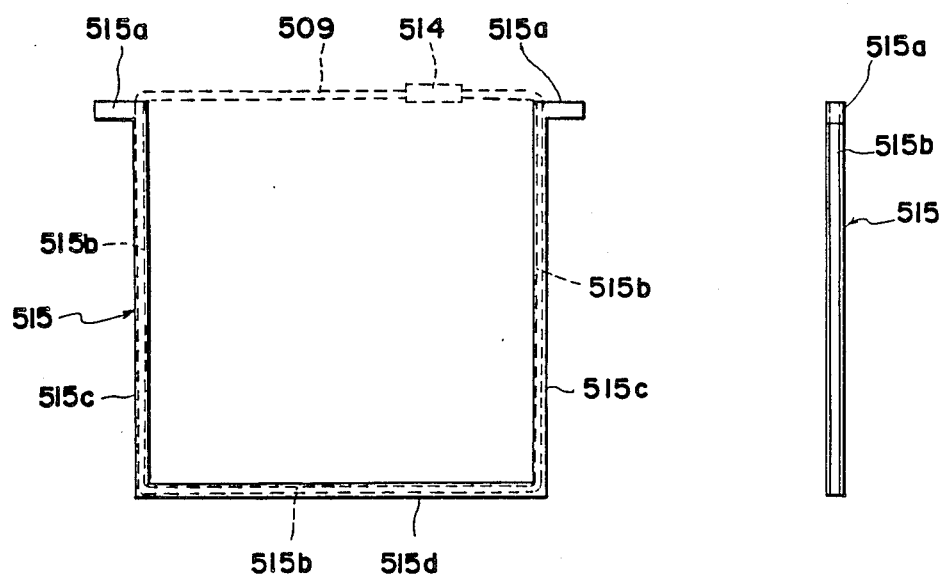

FILTER PRESS

BACKGROUND OF THE INVENTION

1. Field of the Invention

The present invention relates to an improvement of a filter press.

2. Prior Art

Conventionally, a filter press generally comprises a pair of front and rear stands, a plurality of filter plates arranged between the stands, a pair of filter cloths located between the adjoining filter plates and a movable plate which is arranged at a side of the rear stand to press the filter plates so that the, adjoining filter plates contact each other. When filtering is desired, the filter plates are pressed by the movable plate and accordingly raw liquid is fed under a pressure into each chamber defined, between the adjoining filter plates to be filtered.

Meanwhile, various types of filter plates are known as the filter plate used in the filter press. For instance, in the filter plate as shown in FIG. 1, a filtering floor 20b is integrally formed with a rectangular frame 20a. A multiplicity of indentations 20c are formed on both faces of the plate-shaped filtering floor 20b.

However, with above construction of the filter plate, since the filtering floor is integrated and secured to the frame, the total weight of the filter plate is significant. Thus, the filter plate has such disadvantages that handling the plate is difficult, and a large amount of driving force is required to move the plate, thereby increasing the cost of the entire filter press.

In addition, if a significant difference of filtering pressure acting on both surfaces of the filter floor occurs at the time of filtering, the filter floor tends to be deformed with respect to the frame; thus, there is a possibility that the filter floor is broken.

With the configuration according to the present invention, as described above, the filter plate is composed of only a frame and the filter floor is not formed inside the frame. Therefore, the filter plate can be made light in its construction, and also, no significant filter pressure difference between the front and rear portions of the frame occurs at the time of filtering, nor does any damage to the filter plate take place.

SUMMARY OF THE INVENTION

It is, therefore, an object of the present invention to provide a filter press which comprises a pair of front and rear stands, a plurality of filter plates arranged between the stands, each pair of filter cloths located between the adjacent filter plates, a movable plate which is located at a side of the rear stand to press the filter plates so that the adjacent filter plates contact each other, characterized in that each of the filter plates comprises an open filter frame inside which a space is formed.

In the above-mentioned construction, when a raw liquid is supplied into filter chambers formed between each pair of neighboring filter cloths located between the adjacent frames to be filtered, filtrate is caused to be introduced into the spaces in the frames through the filter cloth and directed toward the lower side of the frames. The cake contained in the raw liquid is held in the filter chambers.

BRIEF DESCRIPTION OF THE DRAWING

The above objects and features of the present invention will become apparent from the following description of the preferred embodiments thereof, with reference to the accompanying drawings, in which:

FIG. 52, FIG. 53, FIG. 54 and FIG. 55 are, respectively, a front view, a side elevation of the filter plate, and a front view and a side elevation of a hanging and support frame, according to a further modification of the seventh embodiment; and, FIG. 56 is an enlarged partially sectional view of an essential portion, showing a still further modification of the seventh embodiment in which the filter frame has a concave portion at its corner.

DETAILED DESCRIPTION OF THE INVENTION

Embodiment 1

A first embodiment of the present invention will be described in detail referring to FIGS. 2 through 5 which show a filter plate-filter cloth assembly.

The filter press according to the first embodiment comprises a pair of front and rear stands, a plurality of filter plates arranged between the stands, a pair of filter cloths located between the adjoining filter plates and a movable plate which is located at a side of the rear stand to press the plates so as to contact each other.

Figure 2:
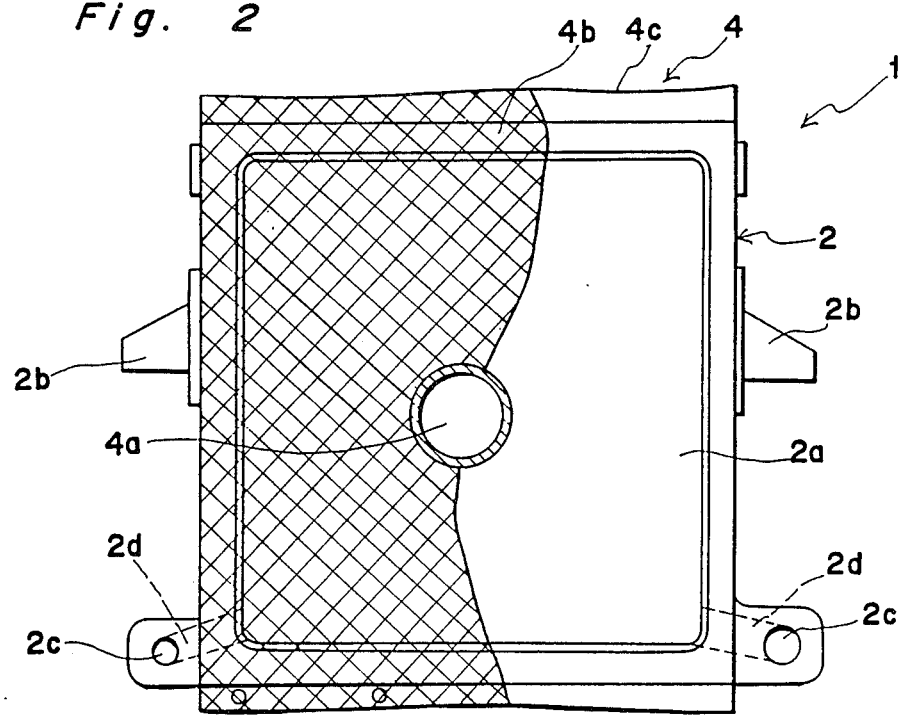
FIG. 2 is a fragmentary front view of a filter plate-filter cloth assembly according to a first embodiment of the present invention.
Figure 3:
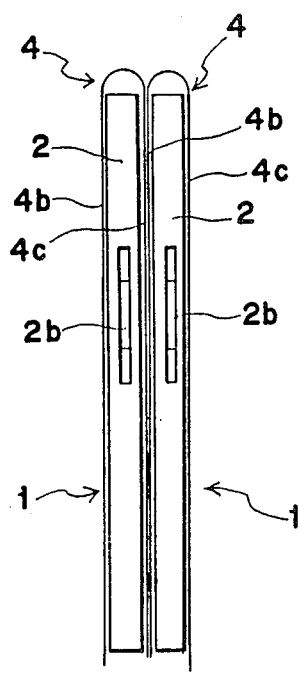
FIGS. 3 and 4 are a side view and a sectional side view respectively showing neighboring two filter plates-filter cloth assemblies.
Figure 4:
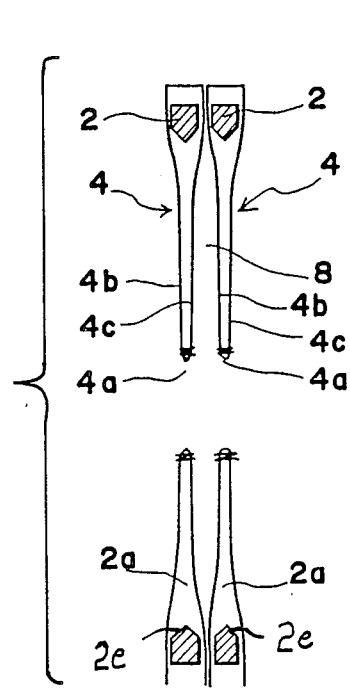

As shown in FIGS. 2 through 4, the assembly 1 comprises a frame 2 as a filter plate and a pair of filter cloths 4b and 4c, which are arranged at both sides of the frame 2 in its depthwise direction. A space 2a is formed inside the frame 2. When raw liquid is supplied into a filter chamber 8 defined by a pair of filter cloths 4b and 4c between the adjacent filter plates and is filtered, a cake is retained in the filter chamber 8 between the filter cloths 4b and 4c, while a filtrate is gathered inside a space 2a of each frame body 2 through each filter cloth 4b or 4c, thus the filtrate is directed to the lower side of the frame 2 to be collected.

The frame 2 is a member whose cross sections have pentagonal configuration, and there are provided slanted surfaces 2e, each of which inclines outwardly from the central portion in the depthwise direction. The side portions of each frame body 2 are provided with corresponding brackets 2b and 2b, each of which is slidably mounted on side beams (not illustrated) installed between the front and rear stands of the filter press so as to suspend the frame 2, thereby guiding the frame 2 forwardly and backwardly. Each side portion of the above-mentioned frame 2 is provided, at its lower end, with a projection, through which a filtrate recovery port 2c is formed therethrough in the depthwise direction. A communicating hole 2d connects the foregoing filtrate-recovery port 2c and the space 2a to each other.

The filter cloths 4b and 4c can be made of various materials conventionally known. A large sheet of filter cloth 4 is so put from above to cover the frame 2 and is so arranged to cover both side surfaces of the frame 2 in the depthwise direction (both sides in forward and backward directions of the filter press), thereby enclosing the space 2a formed in the frame body 2. In the central portion 2 of the filter cloths 4b and 4c are penetrately formed a circularly-shaped raw liquid supply ports 4a and 4a, and the peripheral portions of raw liquid supply ports 4a and 4a of both filter cloths 4b and 4c are seamed together.

According to the construction described above, a plurality of assemblies 1 are hung by the side beams arranged between the front and rear stands so as to freely move forwardly and backwardly. After pressing the filter plates with respect to the front stand by means of allowing the movable plate to proceed forwardly, the raw liquid is so supplied under pressure through the raw liquid supply ports 4a of the filter cloths 4b and 4c into each filter chamber 8 formed between neighboring filter cloths 4b and 4c so that the raw liquid is filtered through the filter cloths 4b and 4c, thereby separating into the cake and filtrate. The cake is retained in the filter chamber 8, while the filtrate passes through the filter cloths 4b and 4c, and is then introduced into the space 2a of the frame 2 and guided into the lower portion of the frame 2 by means of being downwardly guided by the filter cloths 4b and 4c or by means of dropping in the space 2a of the frame 2. The filtrate, then, flows from the communicating hole 2d into the filtrate-recovery port 2c; thus the filtrate is collected.

According to the first embodiment described above, the filter plate comprises only the frame 2, without forming a filter floor in the frame 2, thereby ensuring a very light filter plate compared with a conventional one wherein a filter floor is formed in the frame 2. In addition, since the frame 2 has no filter floor therein, no significant filter pressure between the front portion and the rear portion of the frame taken place at the time of filtering, thereby causing no damage to the filter plate 1.

Figure 1:
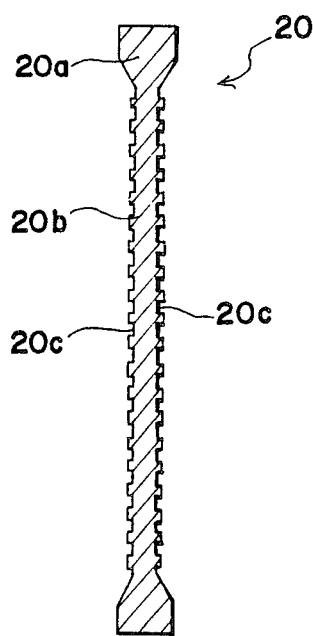
FIG. 1 is a sectional side view of a conventional filter plate, as previously described.
Figure 5:
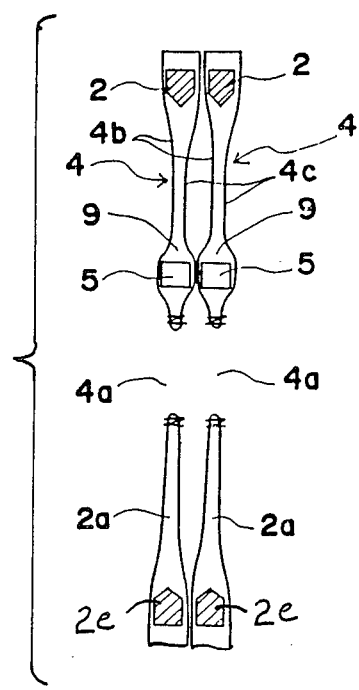
FIG. 5 is a sectional side view of a filter plate-filter cloth assemblies according to a modification of the first embodiment, which have, respectively gap retaining members.

The present invention is not limited only to the embodiment described above; other various configurations are possible for those skilled in the art. For example, as shown in FIG. 5, a gap retaining member 5 may be arranged between the filter cloths 4b and 4c confronting each other so that a space 9 having a certain interval can be maintained between the filter cloths 4b and 4c thus facilitating the flow of the filtrate from the filter chamber 8 into the space 2a of the frame 2 through the filter cloth 4. The gap retaining member 5 may have any desired thickness, configuration, number, or location. Moreover, the filter cloths 4b and 4c enclosing the frame 2 may be separately formed instead of being formed from a single sheet of a filter cloth, and the upper and lower portions of the separated filter cloths are respectively, fastened together by means of bolts or the like so as to be supported by the frame 2. The filter cloths 4b and 4c may be hung not by means of the frame 2 but by means of other members. Also, the arrangement of the raw liquid supply port 4a of the filter cloths 4b and 4c need not be limited only to the central portion thereof confronting the space 2a of the frame, but, for example, a top-feed type or bottom-feed type may be employed wherein such an arrangement is set outside the filter surface. Furthermore, the configuration of the foregoing frame 2 is not limited only to a rectangular shape, but any other configuration, such as circular one, may be employed.

Embodiment 2

FIGS. 6 through 15 show a second embodiment of the present invention. In the second embodiment, the filter plate is provided with a filtrate recovery member, which improves filtrate emission. That is to say, the filter plate-filter cloth assembly comprises a frame, a pair of filter cloths which are located depthwise on both sides of the frame and enclose the space formed inside the frame, and a sheetlike filtrate recovery member which is located in the space inside the frame and supported by either the above frame or the filter cloths, in which the filtrate which has passed through the filter cloths is flowed downward through the frame along the above filtrate recovery member.

Figure 6:
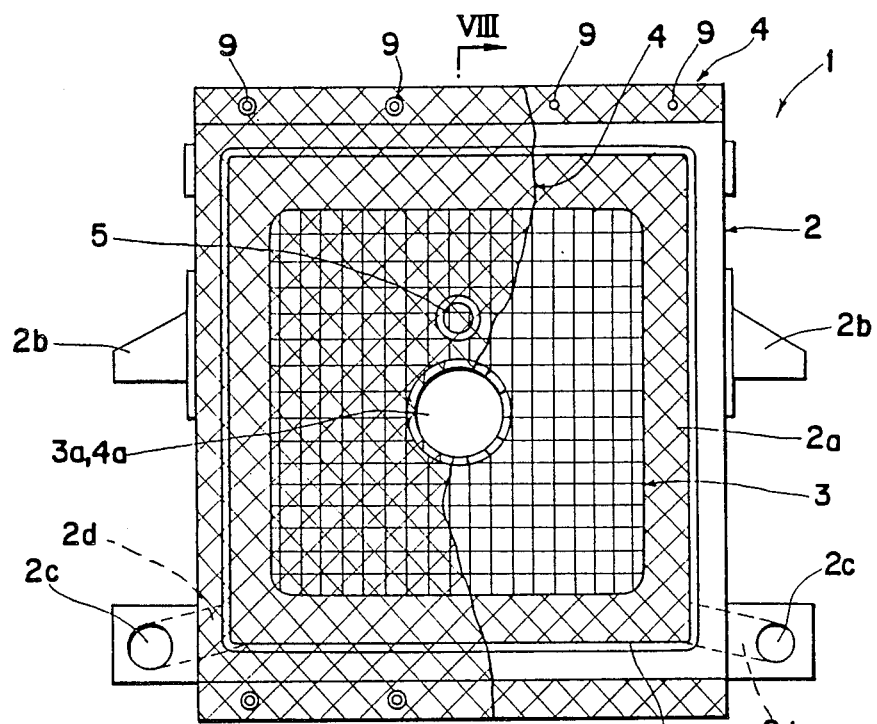
FIG. 6 is a fragmentary front view showing a filter plate-filter cloth assembly according to a second embodiment of the present invention.
Figure 7:
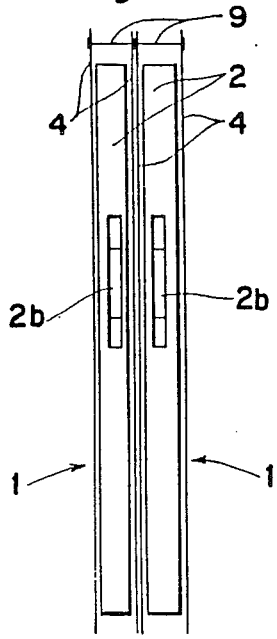
FIG. 7 is a side elevation showing the arrangement of the two assemblies according to the second embodiment.
Figure 8:
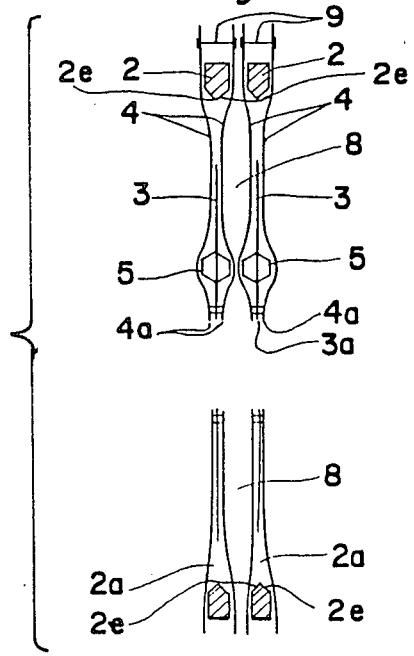
FIG. 8 is a sectional side elevation taken on line VIII—VIII in FIG. 6.

Referring to FIGS. 6, 7 and 8, the assembly 1 comprises a frame 2, a filtrate recovery member 3 supported so that it can freely move within the frame 2, and filter cloths 4, 4 which are located depthwise on both sides of the frame 2 and enclose space 2a within the frame 2. The pair of filter cloths 4, 4 are inserted between the adjoining frames 2. When raw liquid is injected and filtered into a filter chamber 8 defined between the pair of filter cloths 4, the filtrate is gathered into a space 2a within each frame 2 through the filter cloth 4, and is flowed downward along said filtrate recovery member 3 to the bottom of the frame 2 where the filtrate is recovered, while a cake remains in the filter chamber 8 between the filter cloths 4, 4.

The frame 2 described above is a member whose cross sections have pentagonal configuration, inside of which are located slanting surfaces 2e that incline from the center. The side portion of each frame 2 is provided with a bracket 2b which is slidably hung from and supported by side beams (not illustrated) which extend, respectively, between the front and rear stands of a filter press. Thus, each frame 2 is guided to move forwardly and backwardly. On the lower portion of each side of the frame 2 is formed a tab through which a filtrate recovery port 2c passes. At each of the lower corners of the frame 2, a communicating hole 2d is formed so that the space 2a of the frame 2 communicates with the filtrate recovery port 2c.

The material of the filter cloth 4 has been properly selected from various kinds which have been popular in use. Each filter cloth is located depthwise on both sides of the frame 2 (lengthwise on both sides of a filter press), interposing the space 2a formed within the frame 2. The pair of filter cloths 4 whose supper and lower parts are respectively fastened by bolts 9. A circular raw liquid supply port 4a is formed at the center of the filter cloth 4 which corresponds to the center of the frame 2. The periphery of the raw liquid supply ports 4a on the pair of filter cloths 4 are seamed together.

Figure 9:
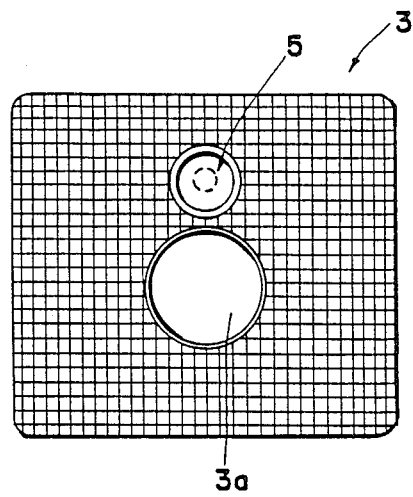
FIG. 9 is a front view of the filtrate recovery member having a gap retaining member, according to the second embodiment.

The filtrate recovery member 3 is made of cloth as shown in FIG. 9 and is located in the space 2a within the frame 2. In the center of the filtrate recovery member 3, a through hole 3a is formed to communicate with the raw liquid supply port 4a on the filter cloth 4. The periphery of the through hole 3a is seamed to that of the raw liquid supply port 4a so that the filtrate recovery member 3 may be hung from and supported by the filter cloth 4. Thus, the filtrate recovery member 3 as well as the filter cloth 4 can oscillate. As described above, since the peripheries of the raw liquid supply port 4a on the filter cloth 4 and the through hole 3a in the filtrate recovery member 3 are seamed together, the seamed portions do not affect the filtering efficiency. The filtrate recovery member 3 preferably has thickness and hardness to some extent so that it can stand in the space 2a of the frame 2 in parallel the filter cloth 4 even if the upper portion of the filtrate recovery member 3 is not be supported by the cloths. The material of the filtrate recovery member 3 may be of arbitrary materials such as natural materials, plastic, or metals.

However, it is preferable that the material be light. When plastic or metal is used, it may be reticulate. Although the front view of the filtrate recovery member 3 shown in the figures is quadrilateral, its shape may be circular or triangular. Certain clearance is formed between the periphery of the filtrate recovery member 3 and the inside surface 2e of the frame 2.

Figure 10:
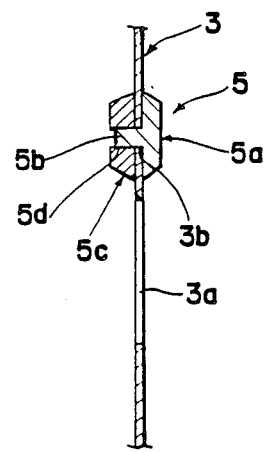
FIG. 10 is a sectional side elevation of the filtrate recovery member as shown in FIG. 9.
Figure 11:
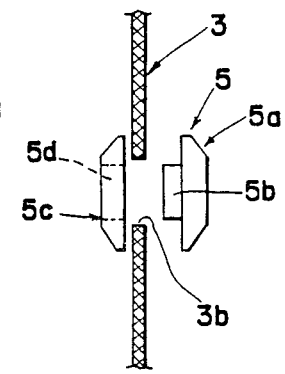
FIG. 11 is a sectional side elevation showing the filtrate recovery member in which the gap retaining member is removed.

In the upper part of the periphery of the through hole 3a in the filtrate recovery member 3, a gap retaining member 5 is mounted, as shown best in FIG. 10, to maintain a certain gap between the filter cloths 4, within the frame 2 so that the filtrate may easily flow into the space 2a of the frame 2 through the filter cloth 4. This gap retaining member 5, as shown in FIG. 11, is mounted on the filtrate recovery member 3 by a fastening means which comprises two half members 5a and 5c. One half member 5a has a projection 5b which is fitted in a hole 5d of the other half member 5c through a hole 3b in the filtrate recovery member 3.

A plurality of assemblies 1, as described above, are hung and supported on the side beams between the front and rear stands so that each filter plate can be moved forward and backward. The assemblies 1 are pressed toward the front stand by a movable plate. Subsequently, raw liquid is injected through the raw liquid supply port 4a of the filter cloth 4 into the filter chamber 8 between such a pair of filter cloths 4, thus separating raw liquid into cake and filtrate. The cake is retained in the filter chamber 8, while the filtrate passes through each filter cloth 4 into the frame 2, then flows downward, guided by the filtrate recovery member 3, to the bottom portion of the frame 2, where it is recovered through the communicating hole 2d and filtrate recovery port 2c.

The filter plate according to above second embodiment can be made much lighter than a conventional one which has a filter floor inside the frame 2. Also, the filtrate can be recovered smoothly by means of the filtrate recovery member 3. Furthermore, even if uneven pressure acts on the member, the member 3 will not be damaged by the pressure, because it can oscillate together with the filter cloth 4 and flexibly transform to absorb the pressure.

Figure 12:
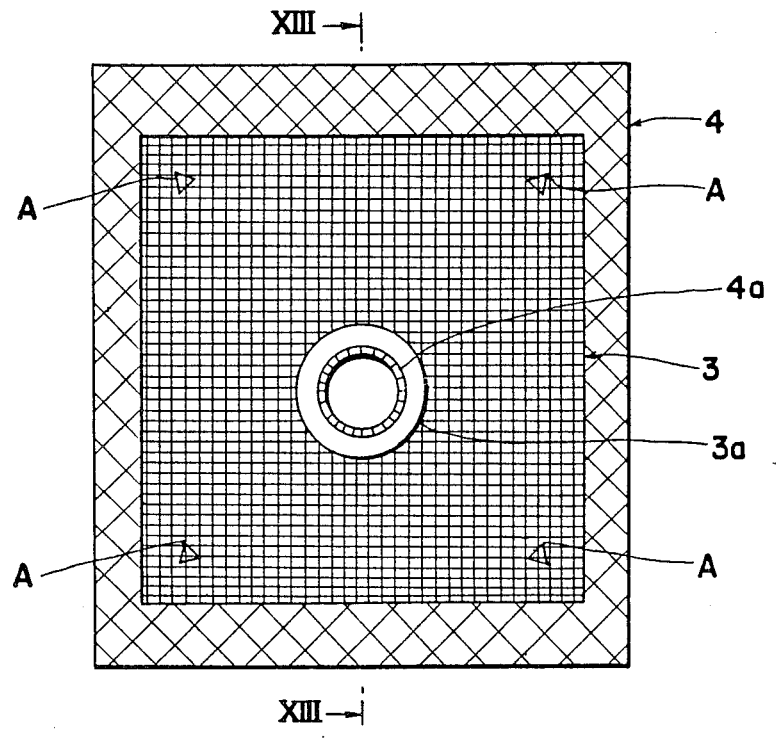
FIG. 12 is a front view showing a filtrate recovery member according to a modification of the second embodiment.
Figure 13:
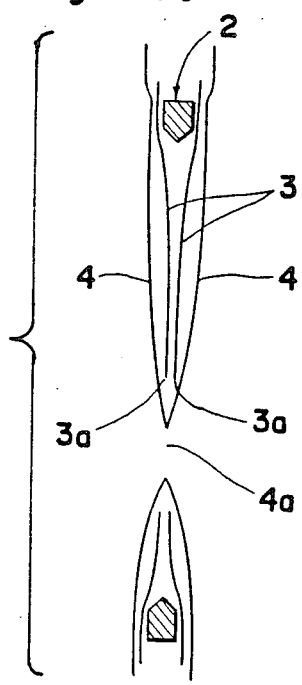
FIG. 13 is a sectional side elevation taken on line XIII—XIII in FIG. 12.

The second embodiment can be modified in various forms. For example, the thickness of the filtrate recovery member 3 is arbitrary. Its size may be larger, expanding to the surface 2e of the frame 2, as shown in FIG. 12, or even larger than the frame 2, exceeding the surface 2e. Such clearance as shown in FIG. 6 is not necessary between the surface 2e of the frame 2 and the periphery of the filtrate recovery member 3. Also, the number of the filtrate recovery member 3 need not be single; it may be two or more as shown in FIG. 13 which is a side elevation view of FIG. 12. The filtrate can be recovered more smoothly when there is more than two filtrate recovery members 3 because a gap may be formed easily between a pair of filter cloths 4 in the space 2a of the frame 2. The filtrate recovery member 3 may be seamed to the filter cloth 4 at arbitrary positions such as at four corners A, as shown in FIG. 12. Also, it can be seamed to a reinforcement pad that is seamed to the filter cloth 4. Furthermore, a filtrate recovery member 3 can absorb uneven pressure by flexibly transforming if it is made of an elastic material. Even if a filtrate recovery member is not elastic, it can absorb uneven pressure if it is movably mounted on the filter cloth 4 or a frame 2. The filtrate recovery member can be either of mesh sheet or can be made of either mesh sheet material or a holeless sheet material.

Figure 14:
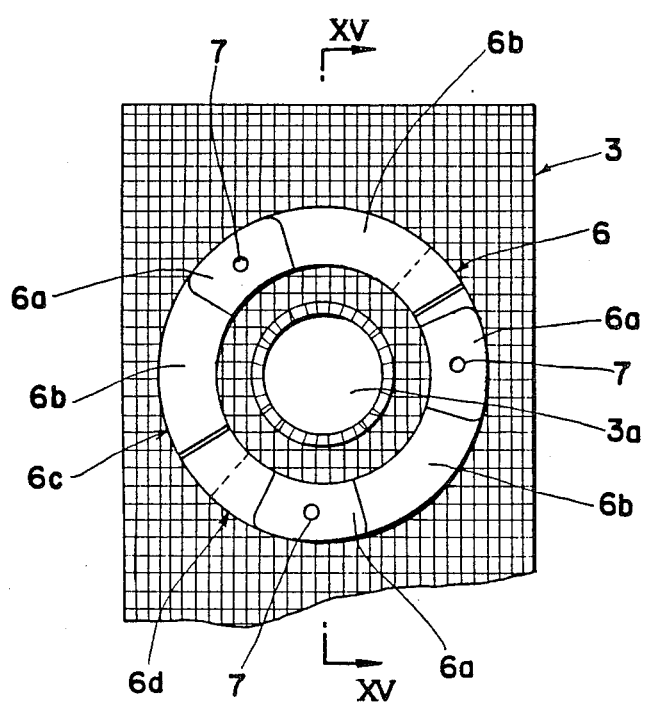
FIG. 14 is a front view showing a filtrate recovery member with the gap retaining member according to a modification of the second embodiment.
Figure 15:
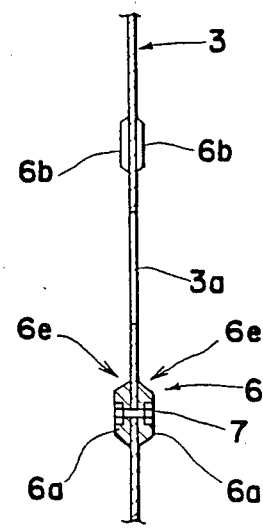
FIG. 15 is a sectional side elevation taken on a line XV—XV in FIG. 14.

The gap retaining member 5 may be omitted depending on the properties of filter cloths 4 and raw liquid. The member 5 can be modified with respect to its form, number, and location. For example, as shown in FIGS. 14 and 15, a pair of circular plates 6e, 6e as the gap retaining member may be mounted on a filtrate recovery member 3 by bolts 7 at the periphery of the through hole 3a of the filtrate recovery member 3. Each of the plates 6e consists of a combination of C-shaped plates 6c and 6d, each having raw liquid supplying concave 6b and contacting projection 6a arranged alternately on the surfaces thereof. Thus, when the filter plates are pressed by a movable plate toward the front stand of a filter press, the projections 6a, 6a of the gap retaining member become contact with each other, forming a gap between the corresponding concavities 6b, 6b which introduce raw liquid into a filter chamber 8.

Embodiment 3

FIGS. 16 through 20 show a third embodiment according to the present invention in which the filter plate as shown in the first embodiment is employed for a type of a filter press including a compression filter plate and pressure receiving plate.

Figure 16:
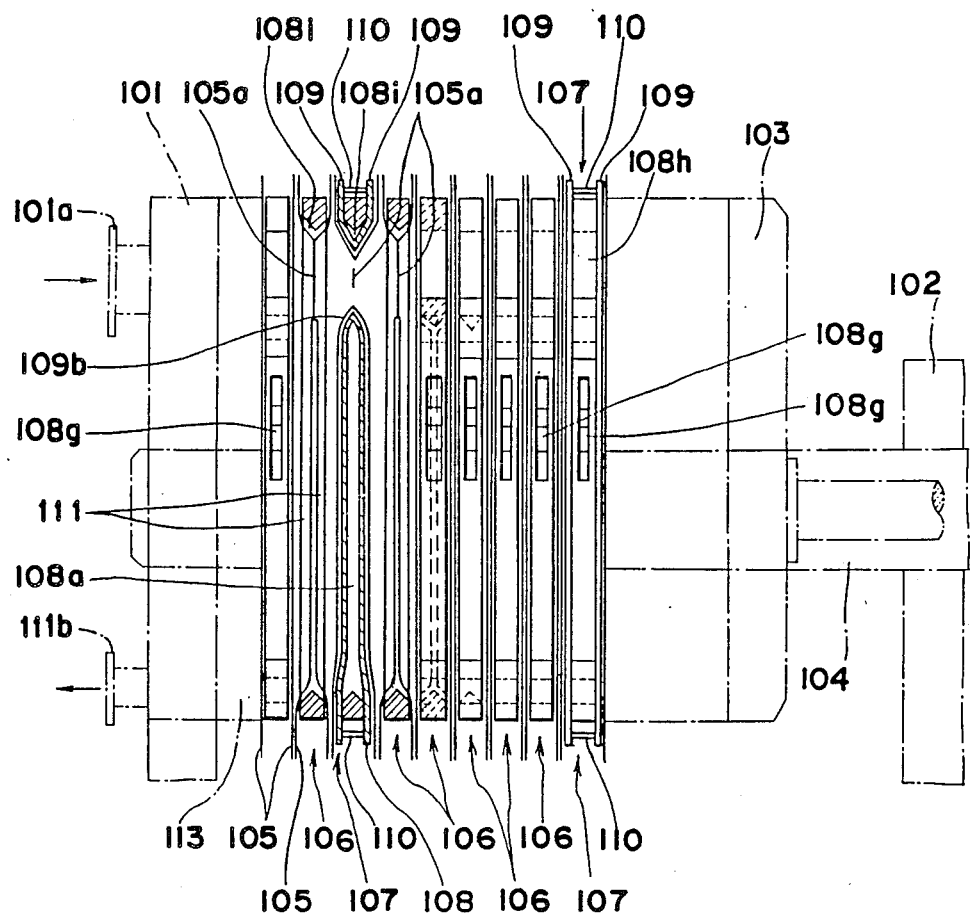
FIG. 16 is a fragmentary cutaway side elevation of a filter press according to an third embodiment of the present invention.
Figure 17:
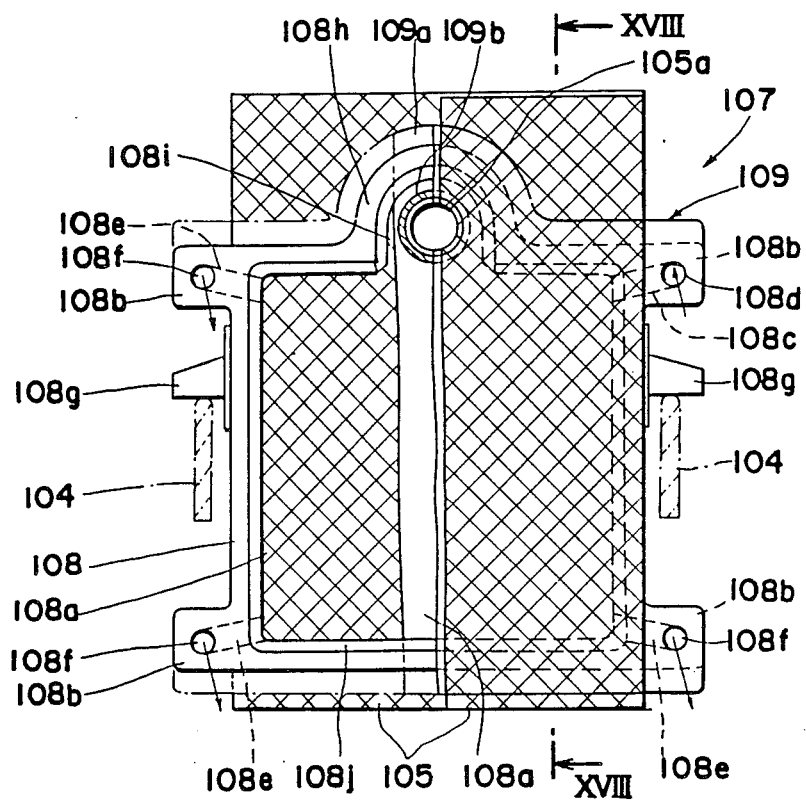
FIG. 17 and FIG. 18 are respectively a front elevation of a compression filter plate, partially covered with a filter cloth, of the filter press and an enlarged sectional side elevation of an essential portion of the filter press, taken along a line XVIII—XVIII in FIG. 17.

The filter press according to the third embodiment of the present invention, as shown in FIG. 16 and FIG. 17, is constructed as follows;

A pair of compression filter plates 107 and 107, each also having the function as a pressure-receiving pate, are arranged between the front stand 101 and the rear stand 102. A plurality of filter plates 106, each consisting of the frame only, are arranged between the compression filter plates 107 and 107 so as to be positioned therebetween. Each compression filter plate 107 and each filter plate 106 are hung from and supported by a pair of side beams 104 and 104 in such a way as to move forwardly and backwardly. A pair of filter cloths 105 and 105 are arranged so as to be positioned between the adjacent filter plates 106 and 106, and between the filter plate 106 and the compression plate 107. The movable plate 103 is located in the rear of the filter plate 106 at the extreme rear. When the movable plate 103 is driven to move forwardly, all the foregoing filter plates 106 and the compression plates 107 are forcibly pressed toward the front stand. After a raw liquid is introduced into the filter chamber formed between each pair of filter cloths 105 and 105, the compression diaphragm 109 of the compression filter plate 107 is forced to expand, thereby the cake inside each filter chamber between both compression diaphragms 109 and 109 of a pair of compression filter plates 107 and 107 are compressed and a filtrate is recovered. When the foregoing movable plate 103 is forced to move backwardly to open the filter plate 106 and the compression filter plate 107, the cake positioned between each pair of filter cloths 105 and 105 is recovered. In FIG. 16, numeral 101a represents a raw material supply pipe formed at the upper center of the front stand 101, and numeral 111b represents a filtrate recovery pipe formed at each side, at the lower portion, of the front stand 101.

Each of the compression filter plates 107 comprises a frame plate 108, at both the front and rear surfaces of which the compression diaphragms 109 and 109 are arranged.

The frame plate 108 is a member, which has cross section of a pentagonal shape and has a slanting inner surface 108j. Close to the middle of each outer surface of each frame 108, there is provided a bracket 108g, which is slidably placed on side beams 104 installed between the front stand 101 and the rear stand 102 of the filter press, hangs and supports the frame 108. At the upper and lower corners of the frame 108, there are formed ear portions 108b; each sidewardly projecting. On one upper ear portion 108b and on a pair of lower ear portions 108b and 108b, there are respectively formed a filtrate recovery opening 108f which passes through in the depthwise direction and is in communication with the clearance between the rear surface of the filter cloth and the front surface of the compression diaphragm through a communicating hole 108e which is in communication with a filtrate opening (not illustrated) perforated into the compression diaphragm 109. On another upper ear portion 108b of the frame 108, there is provided a compressed fluid supply opening 108d which passes through in the depthwise direction and is in communication, through a communicating hole 108c, with an internal space 108a of the frame 108, hence communicating with a space 8a between both compression diaphragms 109 and 109. At the upper center of the frame 108 of each compression plate 107, there is integrally formed a projection 108h which upwardly projects in a reversed U-shape form and, whereon there is formed a notched portion 108for the supply of a raw liquid which passes through in the depthwise direction and is in communication with the internal space 108a of the foregoing frame 108.

At both front and rear surfaces of the frame, resilient diaphragms 109 and 109 known in the art are arranged and fixed at the upper and lower portions thereof by means of bolts 110, etc. At the upper center of each the compression diaphragm 109, there is formed a projection 109a which confronts the projection 108h of the frame 108, and at a portion thereof, confronting the notched portion 108i of the frame 108, there is formed a circular raw liquid supply opening 109b, and the circumferences of a pair of raw liquid supply opening 109b and 109b facing each other, with the frame body 108 positioned therebetween, are seamed closely together so as to prevent a raw liquid passing through the raw liquid supply opening 109b from entering into the space 108a between the compression diaphragms 109 and 109, and also to prevent the compressed fluid from leaking from the vicinity of the raw liquid supply opening 109b, thereby achieving tight closing of the compressed fluids supply space 108a which is inside the frame 108 and positioned between both compression diaphragms 109 and 109.

Since the filter plate 106 has approximately the same construction as that of the frame 108 of the compression filter plate 107, the description of the filter plate 106 is dispensed with by designating the same number to the same part. However, the only difference between the filter plate 106 and the frame 108 of the compression filter plate 107 is that, on another upper ear portion (protruding portion) 108b of the frame 108, there is provided a communicating hole 108c which is used for communicating between the compressed fluid supply opening 108d and the internal space 108a of the frame 108, thus a compressed fluid is supplied into the frame 108 of the filter plate 106.

Each of the filter cloths 105 is formed by arbitrarily selecting a material from a variety of materials known in the art. Each filter cloth 105 is arranged for each filter plate 106 in such a way that the internal space 108a of the frame 108 is positioned between a pair of filter cloths 105 and 105 arranged in the front and rear of each said filter plate 106. At a portion positioned in the upper center of each filter cloth and confronting the notched portion 108h of the filter plate 106, there is formed the circular raw liquid supply opening 105a, and the circumferences of both raw liquid supply openings 105a and 105a of a pair of filter cloths 105 and 105, which face each other with the filter plate 106 positioned therebetween, are adhered together by being seamed or the like, thereby preventing a raw liquid from directly entering into the internal space 108a of the frame 108 of each filter plate 106; as well as the space between both filter cloths 105 and 105. Each filter cloth 105 is arranged for each compression filter plate 107 in such a way that the front surface of the compression diaphragms 109 of each compression filter plate 107 is covered with each filter cloth 105. At a portion positioned in the upper center of each filter cloth 105 and confronting the raw liquid supply notched portion 108i of each of the compression filter plates 107, there is formed the circular raw liquid supply opening 105a, and the circumferences of both raw liquid supply openings 105a and 105a of a pair of filter cloths 105 and 105, which face each other with the compression filter plate positioned therebetween, are adhered together by being seamed or the like, thereby preventing a raw liquid from directly entering in the portion between each filter cloth 105 and each compression diaphragm 109.

Figure 18:
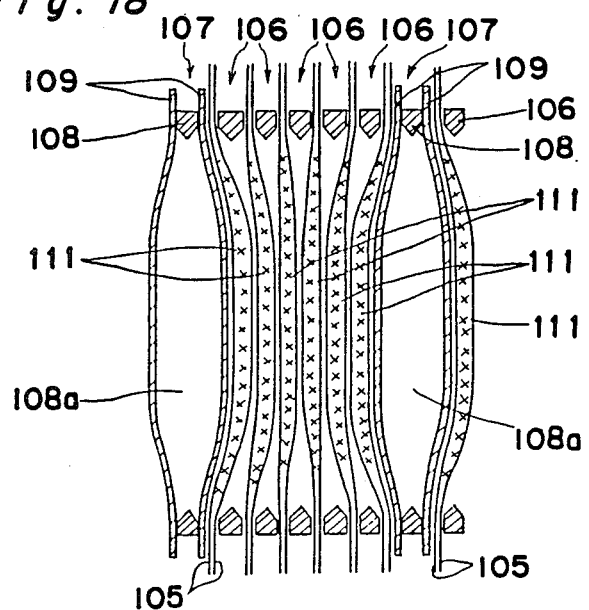

According to the above-described construction, the filter press according to the present invention is operated as described hereinafter;

That is, the movable plate 103 is forced to move forwardly so that all the filter plates 106 and all the compression filter plates 107 are forcibly pressed toward the front stand side and thus are closed, and filtration is then performed by feeding a raw liquid from the raw liquid supply pipe 101a on the front stand 101, through the raw liquid supply openings 105a of the filter cloths 105 inside the notched portion 108i of each filter plate 106, and through the raw liquid supply openings 105a and 105a of the filter cloths 105 inside the raw liquid supply opening 109b of the compression diaphragm 109 of the compression filter plate 107, into the filter chamber 111 formed between each pair of filter cloths 105 positioned between the adjacent filter plates 106 and between the filter plate 106 and the compression filter plate 107. When the raw liquid is introduced into all the filter chambers 111, whereby the raw liquid supply process is completed, a compressed fluid is fed into the compressed fluid supply openings 108d of each filter plate 106 and each compression filter plate 107, and in each compression filter plate 107, the compressed fluid is then introduced from the compressed fluid supply opening 108d, through the communicating hole 108c, into the compressed fluid supply space 108a between a pair of compression diaphragms 109, thereby forcing each compression diaphragm 109 to expand as shown in FIG. 18. The cakes inside the filter chambers, i.e., in FIG. 18, the cakes inside six filter chambers, which are formed between five filter plates 106 and formed between the filter plate 106 and the compression filter plate 107, are compressedly filtered between both compression diaphragms 109. In the above-described filtration and compression filtration, the filtrate is collected from each filtrate recovery opening 108f of the filter plate 106 and the compression filter plate 107, while at the same time the cake is being held between each pair of filter cloths 105 and 105.

Upon the completion of the first compression filtration process, the removable plate 103 is forced to move backwardly, thus forcing all the compression filter plates 107 and all the filter plates 106 to be opened simultaneously or in order of each filter plate 106 or each compression filter plate 107, each being kept at certain intervals away from one another. Once each filter plate 106 and each compression filter plate 107 are opened, the cake positioned and held between each pair of filter cloths 105 drops to be collected, and subsequent compression filtration is then prepared for.

According to the above-described embodiment, each filter plate 106 comprises only the frame body 108, and a pair of the filter cloths 105 which form the filter chamber 111 and which are so constructed as to freely enter themselves into the internal space 108a inside the frame 108 of the adjacent filter plate 106, and therefore, when a number of the filter plates 106 are positioned between a pair of the compression filter plates 107 and 107 and when both compression diaphragms 109 and are forced to expand, a pair of the filter cloths 105 and 105 positioned between the compression films 109 are permitted to freely move within the frame 108 of each filter plate 106, wherein pressure, caused by the expansion of both compression diaphragms 109 and 109, is applied on both the front and rear surfaces of each pair of the filter cloths 105 and 105, thus allowing the secure compression of the cakes inside each filter chamber 111 between the adjacent filter plates 106 and between the compression filter plate 107 and the filter plate 106. Consequently, there is no need to alternately arrange the compression filter plate 107 and the filter plate, thereby allowing a substantial reduction in the number of compression filter plates for the entire filter press, hence allowing a reduction in cost. The free movement of the filter cloths 105 within the internal space 108a of the frame 108 of each filter plate 106 makes it possible to perform the compression with approximately the same pressure being subjected to each of a plurality of the filter chambers 111 which are positioned between the compression films 109, hence allowing the approximately uniform compression of the cakes inside the filter chambers 111. Further, the filter plate 106 does not form a filter floor in the frame 108 thereof, but is configured from only the frame 108, thus making the entire filter plate substantially lighter than the conventional ones which form the filter floor in the frame 108.

Figure 19:
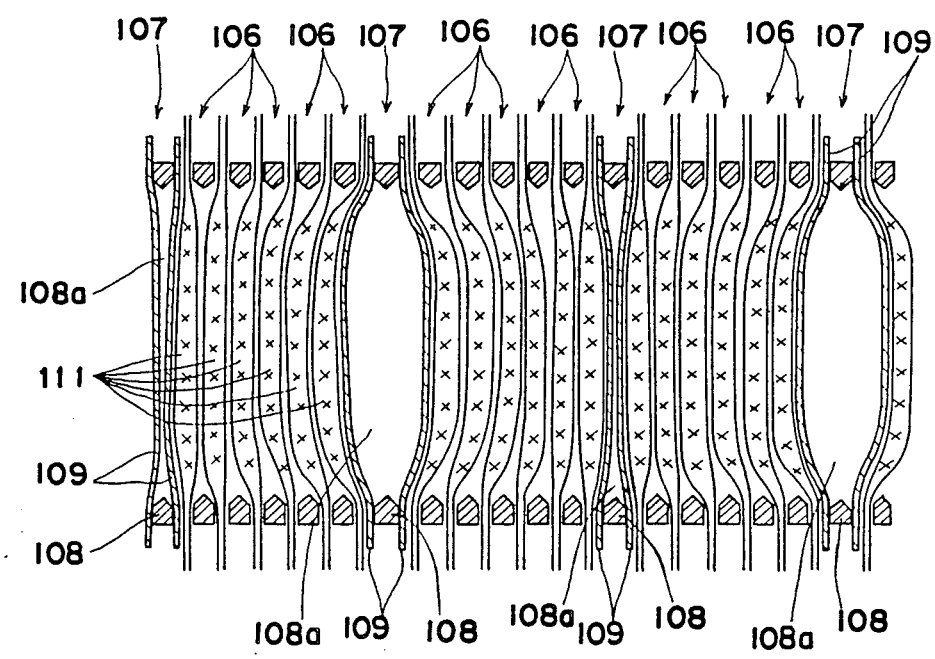
FIG. 19 is an enlarged sectional side elevation of an essential portion of the filter press according to a modification of above embodiment.
Figure 20:
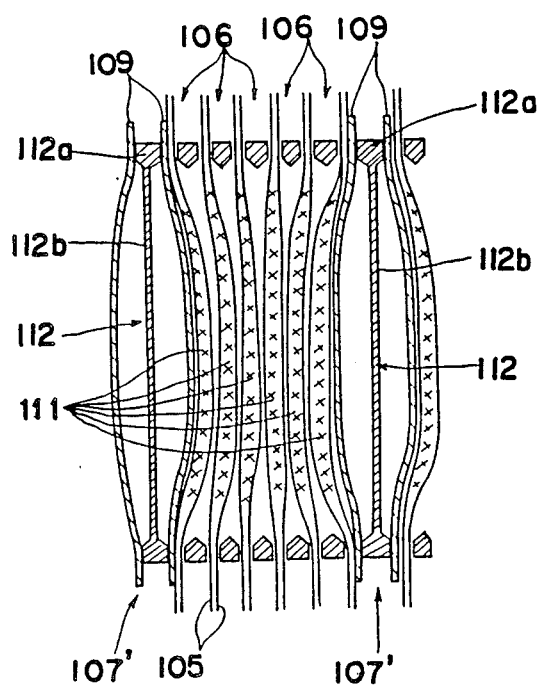
FIG. 20 is an enlarged sectional side view of an essential portion of the filter press according to another modification of above embodiment.

The above embodiment can be modified as follows;

For instance, the smaller the depthwise direction dimension of the frame of each filter plate 106 positioned between the compression filter plates 107 and 107, the more the filter plates 106 which can be arranged between both the compression filter plates 107, thus the number of filter chambers 111 formed between the filter plates is increased, resulting in improved filtering efficiency, hence achieving a more uniform compression filtration. Instead of forcing the compression diaphragms 109 of a pair of the compression filter plates 107 to expand approximately simultaneously as shown in FIG. 18, the compressed fluid, as illustrated in FIG. 19, may be introduced into the compressed fluid supply space 108a of the alternate compression plate 107 (the compression plates 107 located at both ends in FIG. 19) and the compression diaphragm 109 is forced to expand, and the compressed fluid is then removed from these compressed fluid supply space 108a, while at the same time the compressed fluid is being introduced into the compressed fluid supply space 108a of the remaining compression filter plate 107 (the compression filter plate 107 located at the center in FIG. 19) and the compression diaphragm 109 is forced to expand, thus accomplishing the compression of the cake inside each filter chamber 111 positioned between the compression diaphragm 109 which does not expand but functions as a pressure-receiving surface of the pressure-receiving plate, and the compression diaphragm 109 which expands. The compression filter plate 107 is not limited to the one which consists of just the frame 108 covered with the compression diaphragms 109, but can be replaced with the conventional compression filter plate 107' equipped with the compression diaphragms 109, as shown in FIG. 20, having a filter plate 112 which consists of the frame 112a and a filter floor 112b integrally fixed thereto. Depending on the quantity and thickness of the filter plate 106 of the compression plate 107, the compression filter plate 107 may be arranged in the middle between the front and rear stands, or at either end of the front stand side or the movable plate side, and the compression diaphragm 109 of the compression filter plate 107 is forced to expand toward the movable plate 103 as a pressure-receiving plate or toward the primary plate 113 as a pressure-receiving plate fixed to the front stand 101, thereby achieving the compression of the cakes inside the filter chambers 111. The filter cloths 105 can be hung and supported by means of a variety of methods known in the art such as the filter plate frame 108, a hanging device located at the upper portion of the front stand 101 and the rear stands 102, and can be fixed to the filter plate. The raw liquid supply opening 105a of each filter cloth 105 may be located at the filter surface inside the frame 108 and at the lower portion of the frame 108 away from the filter surface, i.e., the so-called bottom feed type is available. Each foregoing filter plate 106 and compression filter plate 107 are not limited to the rectangular shape, and may have an arbitrary shape such as a circular shape.

Embodiment 4

FIGS. 21 through 29 show a fourth embodiment which provides a filter press which utilizes filter plates as shown in the first embodiment and in which the number and locations of the raw liquid supply ports can be easily adjusted as desired depending on the filtering conditions, and at the same time, the supply pressure of the raw liquid is effectively prevented from being lowered.

Figure 21:
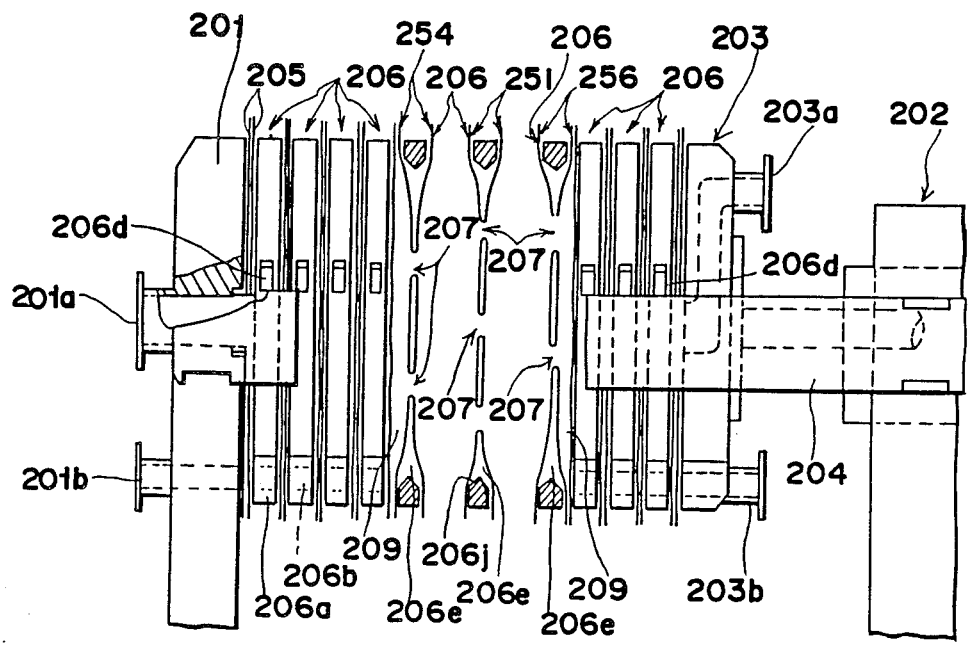
FIG. 21 is a fragmentary sectional side elevation of a filter press according to an fourth embodiment of the present invention.
Figure 22:
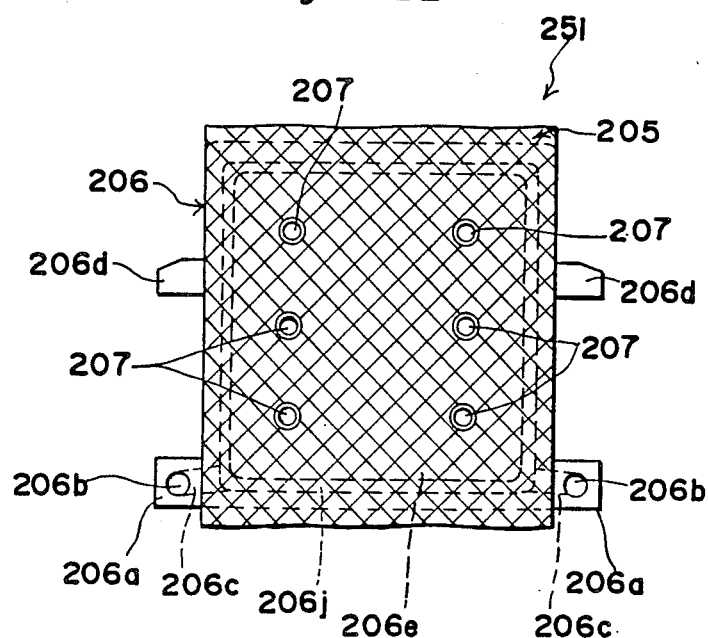
FIGS. 22 through 27 are, respectively, front views showing a filter cloth according to various modifications wherein a plurality of raw liquid supply ports are provided.

Referring to FIGS. 21 and 22, a pair of side beams 204 are so arranged to be positioned at both sides of the front and rear stands 201 and 202 thereof. A multiplicity of filter plates 206 composed of only a frame are so arranged as to be positioned between the front and rear stands 201 and 202 therebetween, as well as to be hung by the side beams 204 therewith in such a manner as to be freely movable forwardly and backwardly. A pair of filter cloths 205 are positioned between the adjacent filter plates 206. A plurality of raw liquid supply ports 207 on each filter cloth are so formed as to be positioned at the portion corresponding to the filtering potion of the frame of the filter plates 206. A movable plate 203 so arranged as to be positioned at the rear portion of the filter plate 206 which is positioned at the most rear portion thereof, is driven forwardly with the aid of a driving system not illustrated, thereby pressing all the filter plates 206 toward the front stand, and thus the raw liquid is supplied from a raw liquid supply pipe 201a of the front stand 201 through the raw liquid supply port 207 of each filter cloth 205 into the filter chamber 209 so arranged as to be positioned between each pair of filter cloths 205; thus the filtering process is performed.

In FIG. 21, 201b is a filtrate collecting pipe so formed as to be positioned at a lower side of the front stand 201, 203a is a raw liquid supply pipe so formed as to be positioned at the central portion of the movable plate 203, and 203b is a filtrate collecting pipe so formed as to be positioned at either lower side of the movable plate 203.

The filter plate 207 comprises a frame which is a member having a pentagonal configuration in a cross section, and which is provided with a slanting surface 206j slanting outwardly from the central portion therefrom in the depthwise direction. A bracket 206d is provided on each side portion of each frame 206. The brackets 206d are slidably mounted on the side beams 204, thereby guiding each filter plate 206 forwardly and backwardly. Each lower corner portion of each filter plate 206 is provided with an ear portion 206a which protrudes outwardly therefrom. The ear portion 206a is provided with a filtrate collecting port 206b so formed as to penetrate therethrough in the depthwise direction. A communicating hole 206c is formed on the ear portion 206a so as to communicate with the filtrate collecting port 206b and a space 206e formed in the filter plate 206.

Figure 23:
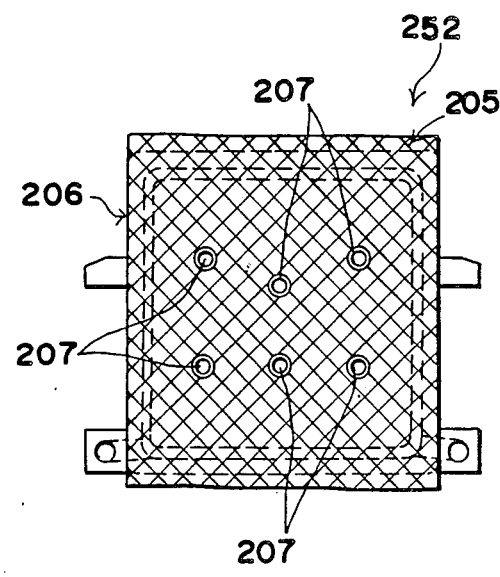
Figure 24:
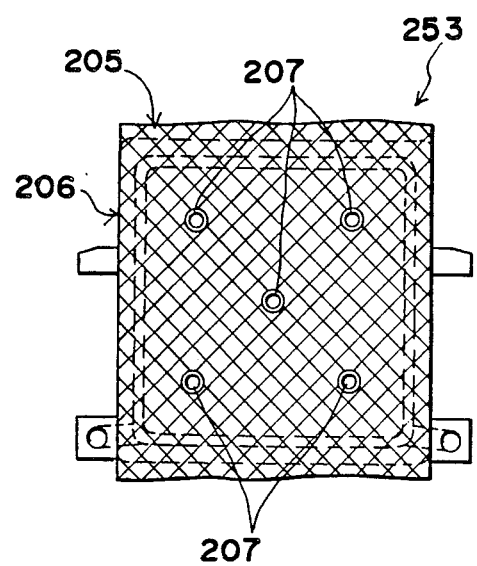
Figure 25:
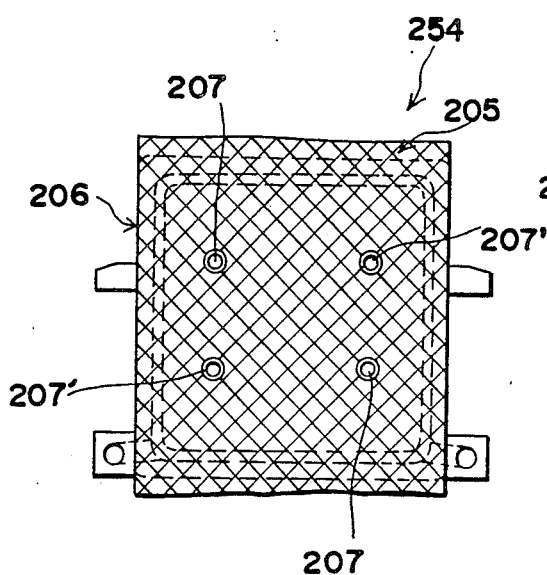
Figure 26:
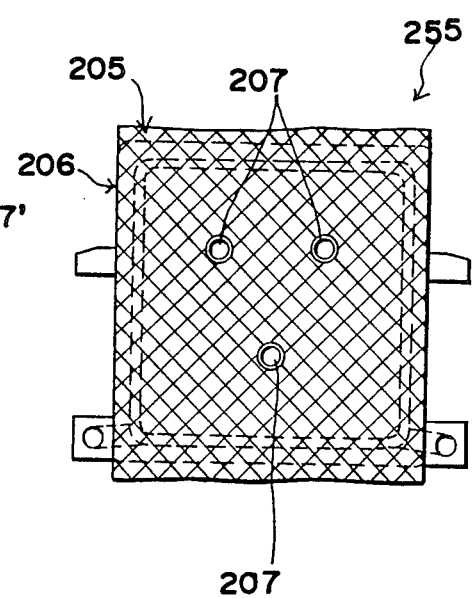
Figure 27:
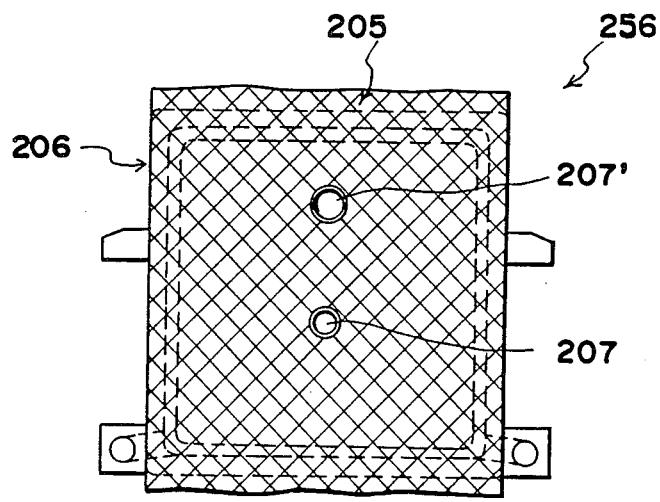

The filter cloth 205 is replaceably arranged at both front and rear sides of each filter plate 206 so that a pair of filter cloths 205 can surround the inner space 206e formed in the filter plate 206 thereof. There are various conventionally known methods employed for replaceably hanging each filter cloth 205, for example, such as a method wherein the filter cloth 205 is hung with respect to the frame of the filter plate 206 by means of a hook member such as a pin, a method wherein the filter cloth 205 is hung by means of a hanging device so arranged as to be positioned at the upper portion between the front and rear stands 201 and 202, or a method wherein the filter plate 206 is covered by means of a large sheet of filter cloth from above so that both front and rear sides of the filter plate 206 confront the corresponding half of the filter cloth. Also, as shown in FIGS. 22 through 27, raw liquid supply ports 207 are so formed in each filter cloth 205 as to be positioned at various locations in different number at the portion corresponding to the space 206e of each filter plate 206. That is to say, when forming six raw liquid supply ports 207 at the filtering portion of the filter cloth 251, as shown in FIG. 22, two vertical rows composed of three raw liquid supply ports are so arranged as to be positioned in parallel with each other at regular intervals. Each raw liquid supply port 207 is provided with a circular through hole which is formed by means of fitting an eyelet from both surfaces of the filter cloth 251. In FIG. 23, the number of raw liquid supply ports 207 of the filter cloth 252 is six, i.e., same as the construction described above; however, the raw liquid supply ports 207 are so arranged as to be symmetrically in two rows on the right and left sides thereof, wherein the raw liquid supply port 207, interposed between the upper two raw liquid supply ports in the upper central portion, is so positioned as to be at a slightly lower position. In addition, when forming five raw liquid supply ports 207 in the filter cloth 253, as shown in FIG. 24, those raw liquid supply ports should be so arranged as to be positioned approximately uniform with respect to the filtering portion of the filter cloth 253 thereof. When forming four raw liquid supply ports in the filter cloth 254, as shown in FIG. 5, those raw liquid supply ports should be so arranged as to be approximately uniform with respect to the filtering portion of the filter cloth 254 thereof. When forming three raw liquid supply ports 207 in the filter cloth 255, as shown in FIG. 26, those raw liquid supply ports should be so arranged in a shape of a reversed triangle as to be approximately uniform with respect to the filtering portion of the filter cloth 255. When forming two raw liquid supply ports 207 in the filter cloth 256, as shown in FIG. 27, those raw liquid supply ports 207 should be so arranged in the central portion in a vertical row as to be positioned approximately uniform with respect to the filtering portion of the filter cloth 256.

The number and position of the raw liquid supply ports 207 are determined depending on the filtering conditions, such as the characteristics of the raw liquid, the raw liquid supply pressure, the filtering area of the frame, etc. However, the raw liquid supply ports 207 should not be necessarily so arranged as to be uniform with respect to the filtering portion of each filter cloth 205. The raw liquid supply port 207 may have a diameter, for example, ranging from 3 to 30 mm, more preferably, as small as possible so as not to reduce the filtering area. Furthermore, in FIG. 25, two raw liquid supply ports 207' and 207' located at the upper right portion and the lower left portion thereof, respectively, may be so formed as to have larger diameter than those of other raw liquid supply ports 207 and 207. In FIG. 27, the upper raw liquid supply port 207' is so formed as to have a larger diameter than that of the lower raw liquid supply port 207.

Thus, a plurality of filter cloths 205 having a different number of raw liquid supply ports 207 are positioned between the front and rear stands 201 and 202. For example, in three filter plates 206 positioned at the central portion as shown in FIG. 21, a pair of filter cloths 251, each having six raw liquid supply ports 207 as shown in FIG. 22, are arranged at both sides of the intermediate filter plate, a pair of filter cloths 254, each having four raw liquid supply ports 207 as shown in FIG. 25 are arranged at both sides of the front filter plate, and a pair of filter cloths 256 having six raw liquid supply ports 207 as shown in FIG. 27 are arranged at both sides of the rear filter plate.

In the filter press having a construction as described above, the movable plate 203 is first forced forward so as to press all the filter plates 206 toward the front stand thereof, thereby allowing the filter plates 206 to close; then the raw liquid is fed from the raw liquid supply pipe 201a of the front stand 201 through the raw liquid supply ports 207 formed in a pair of filter cloths 205 closest to the front stand 201 into a first filter chamber 209. Subsequently, when the first filter chamber 209 is filled to a certain degree, the raw liquid enters the second filter chamber 209 defined by a second pair of filter cloths. When the second filter chamber 209 is supplied with the raw liquid to some extent, the raw liquid is then fed through the raw liquid supply port 207 formed in the third pair of filter cloths 205 and 205 into the third filter chamber 209. Thus, the raw liquid is consecutively fed from the first filter chamber to the last filter chamber 209 When the raw liquid is fed into each filter chamber, the filtering operation is initiated in each filter chamber, and when each filter chamber 209 is substantially filled with the raw liquid, the filtering process is advanced in such that the cake is maintained between each pair of filter cloths 205, while the filtrate flows downwardly along the filter cloth 205. Thus the filtrate is collected into filtrate collecting ports 206b of each filter plate 206. Upon completion of one cycle of the filtering process, as is well-known, the movable plate 203 is moved backwardly so as to force each filter plate 206 to move backwardly, thereby collecting the cake retained by each filter chamber, thus preparing for the next filtering operation.

According to the embodiment as described above, each filter plate 206 comprises only a frame, and a plurality of raw liquid supply ports 207 are formed at the filtering portion of the filter cloth 205 corresponding to the filtering portion of the frame of the filter plate 206, and each filter cloth 205 is replaceably arranged on the filter plate. Therefore, when the supply condition of the raw liquid is to be altered depending on the filtering conditions such as the characteristics of the raw liquid, filtering pressure, and the like, the filter plate 206 is left to be so arranged as to be positioned between the front and rear stands 201 and 202, and only the filter cloth 205 is replaced with another filter cloth 205 having a different location or a different number of raw liquid supply ports 207. Accordingly, the number as well as the location of the raw liquid supply ports 207 can be easily adjusted, and the raw liquid supply pressure can be effectively prevented from being lowered, thereby enhancing filtering efficiency. In addition, since a plurality of raw liquid supply ports 207 are formed at the filtering portion of the frame, the raw liquid or a gas generated by the raw liquid can easily enter and go out through the raw liquid supply ports 207, whereby the supply pressure of the raw liquid fed into the filter chambers 209 can be made uniform throughout all the filter chambers 209. Consequently, even if the number of the filter chambers increases, the difference of the raw liquid supply pressure between the filter chambers 209 at the raw liquid supply side and the filter chamber 209 positioned at the opposite side is reduced, whereby a constant raw liquid supply pressure, i.e., filtering pressure, can be applied to each filter chamber 209, thus enhancing filtering efficiency. Furthermore, in the conventional construction, when the raw liquid containing particles, having significant sedimentation properties, is filtered, the raw liquid supply port is generally apt to be clogged at the lower portion of the filter chamber 209, and even if a single raw liquid supply port 207 is provided at the lower portion of the filter chamber, the port is soon clogged. However, as for this kind of raw liquid, if a plurality of raw liquid supply ports 207 are formed at both lower and upper portions of the filter cloth, each lower raw liquid supply port 207 is prevented from being clogged, and in the upper portion, a plurality of raw liquid supply ports 207 allow the raw liquid supply pressure, i.e. filtering pressure of the filtering portion of the filter plate 206, to be substantially uniform. Also, no filtering floor is formed in the frame of the filter plate 206, but instead, the filter plate 206 comprises only a frame, providing a very light filter plate compared with the conventional one wherein a filtering floor is formed in the frame.

It should also be understood that the fourth embodiment can be easily modified as follows;

For example, in the above embodiment, if the raw liquid supply ports 207 of each pair of filter cloths 205, which are confronting each other between each pair of neighboring plates 206, are so arranged as to be uncontinuous in the depthwise direction thereof, the raw liquid is securely introduced from the raw liquid supply port 207 into the filter chamber 209 until the raw liquid reaches a given quantity, i.e., up to the position of the raw liquid supply port 207 formed in the filter cloth 205 to which the raw liquid is fed, and then the raw liquid can subsequently fed to and filled in the next filter chamber 209 through the raw liquid supply port 207 of the preceding filter cloths. Thus the raw liquid can be securely fed and filled in each filter chamber 209. It is to be noted that in the conventional construction, since each filter cloth has only one raw liquid supply port 207 which is aligned with the raw liquid supply ports of other filter cloths, the raw liquid is, depending on the raw liquid supply pressure, fed to the advancing filter chambers 209 before the preceding filter chambers 209 are sufficiently fed, thus resulting in some filter chambers 209 being sufficiently filled with the raw liquid but other filter chambers 209 not being sufficiently filled with the raw liquid. Therefore, the raw liquid is not uniformly fed and filled into each filter chamber 209, causing deterioration of filtering efficiency. This kind of disadvantage can be eliminated according to the construction described above.

Alternately, the raw liquid may be fed not only from the raw liquid supply pipe 201a of the front stand 201, but also from the raw liquid supply pipe 203a of the movable plate 203 thereof, or the raw liquid may be also simultaneously fed from both raw liquid supply pipes 201a and 203a.

Figure 28:
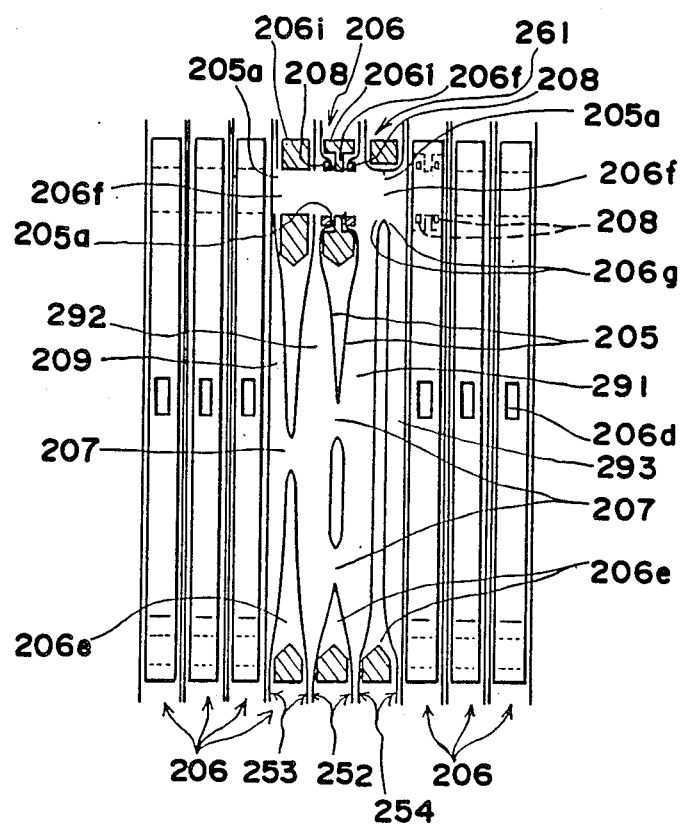
FIG. 28 is a fragmentary sectional side elevation of a main portion of a filter press according to another modification.
Figure 29:
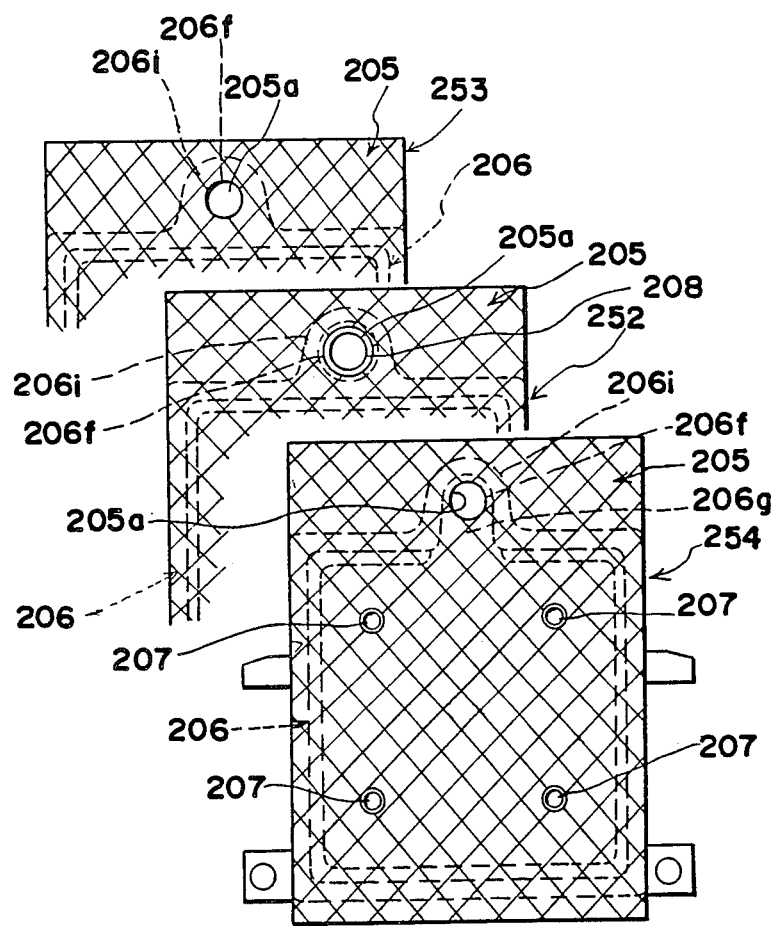
FIG. 29 shows developed perspective views of the main filter plates and filter cloths shown in FIG. 28.

In addition, as shown in FIGS. 28 and 29, the raw liquid may be fed from the filter plate indicated by a numeral 261 in FIG. 28, which is so arranged as to be positioned at the central portion of the filter press, toward the front stand and the movable plate. That is, an upper central portion of each filter plate 206 is upwardly protruded in the form of a reversed U-shape so as to form a protruding portion 206i, and also, the protruding portion 206i is provided with a communication hole 206f for supplying the raw liquid. In addition, another communication hole 205a for supplying the raw liquid is so formed in each filter cloth 205 as to correspond with the communicating hole 206f. A communicating opening 206g which communicates with the communicating hole and the inner space 206e is formed at the protruding portion 206i of the filter plate 261. The raw liquid is, for example, supplied from the raw liquid supply pipe 201a of the front stand 201 to the above-described filter plate 261 through the communicating hole 206f in the direction from the left side toward the right side in the FIG. 28, without supplying the raw liquid to the filter chambers 209 located between the filter plates 206, and then the raw liquid is supplied into the left side filter chamber 291 of the above-described filter plate 261 through the communicating opening 206g. When the filter chamber 291 is filled with the raw liquid, the raw liquid is then supplied to the next left side filter chamber 292 through the raw liquid supply port 207 therethrough. On the other hand, when the right side filter chamber 293 of the above-described filter plate 261 is filled with the raw liquid through the communicating holes 205a and 206f, the right side filter chamber 209 is further supplied with the raw liquid through the raw liquid supply port 207. In FIG. 28, 208 is a ring which serves to closely fit the peripheral portion of the communicating hole 205a with a circumferential concave portion of the communicating hole 206f formed in the filter plate 206 adjacent to the above-described filter plate 261. Therefore, the raw liquid is prevented by the ring from entering the portion between the filter cloth 205 and filter plate 206 therebetween. The above-described communicating hole 206f may be so formed as to be provided with a protruding portion formed at the lower portion of the filter plate 206 in order to perform the same functions described above, or a circular raw liquid supply plate having the foregoing raw liquid supply communicating hole may be fixed to a position corresponding to the central filtering portion of the filter plate of the filter cloth 205, so that the same action as described above can be performed so as to supply the raw liquid.

Also, the configuration of the above-described raw liquid supply ports 207 are not limited to a circular shape only; any other configuration such as, for example, a hexagonal or rectangular shape may be employed. Further, the raw liquid supply port 207 is not limited only to the one composed of an eyelet; the raw liquid supply port 207 may be formed by means of applying and fastening a circular member to both sides of the filter cloth 205 thereof, or by means of making a hole in the filter cloths 205 therein and then seaming together the peripheral portion of the holes, or by means of applying a pad to the filter cloth 205 and then seaming together the applied cloth and the filter cloth 205.

Moreover, the configuration of the above-described filter plate 206 is not limited only to a rectangular shape; any other desired shape, such as circular, may be employed.

Also, the filter plate 206 includes a so-called compression filter plate.

Embodiment 5

According to a filter press of the first and second embodiments, a number of filter plates comprising a frame are arranged between front and rear stands; a raw liquid supply port is formed in the filtering portion on each filter cloth; in which all of the filter plates described above are pressed toward the front stand by a movable plate located at the back of the rearmost filter plate and the raw liquid is supplied and filtered through the raw liquid supply port on the filter cloths into a filter chamber between a pair of filter cloths.

However, in the above construction, as the filter cloth is not supported, at the periphery of the raw liquid supply port to retain a certain location against a frame, the raw liquid supply port moves freely by raw liquid supply pressure. Also the raw liquid supply ports, each of which has substantially the same shape, communicate straightly lengthwise, consequently, when slurry containing tarlike liquid or much clay component are filtered in the filter press, a cake adheres to the periphery of the raw liquid supply port in the filter cloth as filtering pressure becomes higher. Also the periphery of the raw liquid supply port to which the cake adheres may move by the raw liquid supply pressure, thus making the periphery of the raw liquid supply port on the adjoining filter cloths stick together by an action of the cake component, i.e. tar component or clay component. Therefore, sufficient raw liquid is not supplied into the filter chamber defined by each pair of cloths whose raw liquid supply ports are stuck together on their peripheries and effective filtering area against the whole filtering area decreases, lowering the filtering efficiency.

The object of a fifth embodiment is to solve the problems described above, providing a filter press which can supply sufficient raw liquid into each filter chamber and improve the filtering efficiency even though slurry may contain tarlike liquid or much clay component.

The fifth embodiment according to the present invention are described in detail with reference to FIGS. 30-34.

Figure 30:
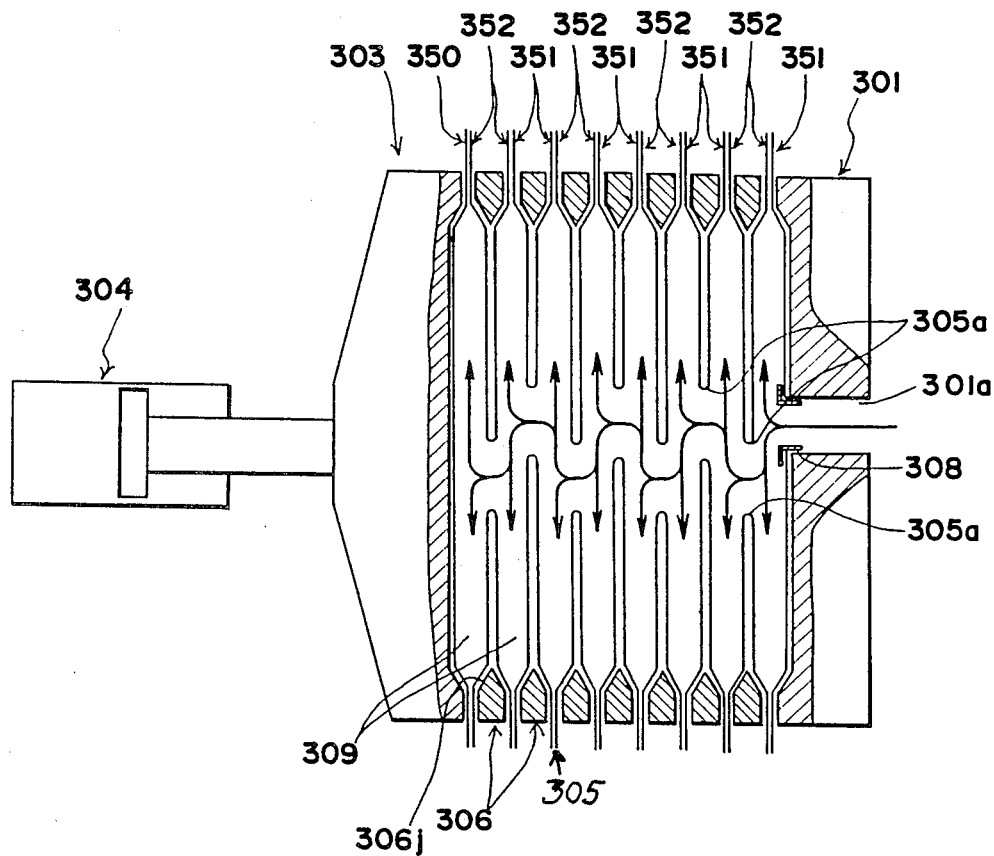
FIG. 30 is a side elevational view, partially in cross section, showing a filter press according to a fifth embodiment of the present invention.

In the filter press according to the present embodiment, as shown in FIG. 30, side beams 302 (See FIG. 31) are located on both sides between front and rear stands, between which a number of filter plates 306 comprising only a frame are arranged so as to be hung from and supported on the side beams 302 so that they may move lengthwise. A pair of filter cloths 305 are interposed between adjoining filter plates 306. A raw liquid supply port is formed in the filtering portion of the filter cloth which corresponds to a filtering portion of the frame. The position of the raw liquid supply ports 305a are staggered in each pair of filter cloths 305. All of the filter plates 306 are pressed by a driving apparatus 304 toward the front stand through a movable plate 303 which is located at the back of the rearmost filter plate 306. Subsequently, the raw liquid is supplied and filtered from a raw liquid supply tube 301a of the front stand 301 through the raw liquid supply port 305a on each filter cloth 305 into a filter chamber 309 formed between a pair of filter cloths 305, 305. In the FIG. 30, 308 is a bracket which fastens the periphery of raw liquid supply port 305a on filter cloth 351, which is located close to the front stand 301, to the front stand 301, 350 is a filter cloth close to movable plate on which a raw liquid supply port 305a is not formed.

Each filter plate 306 comprises a frame. The frame is a member having pentagonal a cross section. A pair of inner surfaces 306j form V-shape in cross section. A bracket 306d extends from each side of the frame 306 so as to be slidable on the side beams. A tab 306a projects outwardly from a lower corner of the filter plate 306. A filtrate recovery port 306b is formed depthwise in said tab 306a. A communicating hole 306c which communicates said filtrate recovery port 306b with the space 306e in the filter plate 306 is also formed on the tab 306a.

Figure 31:
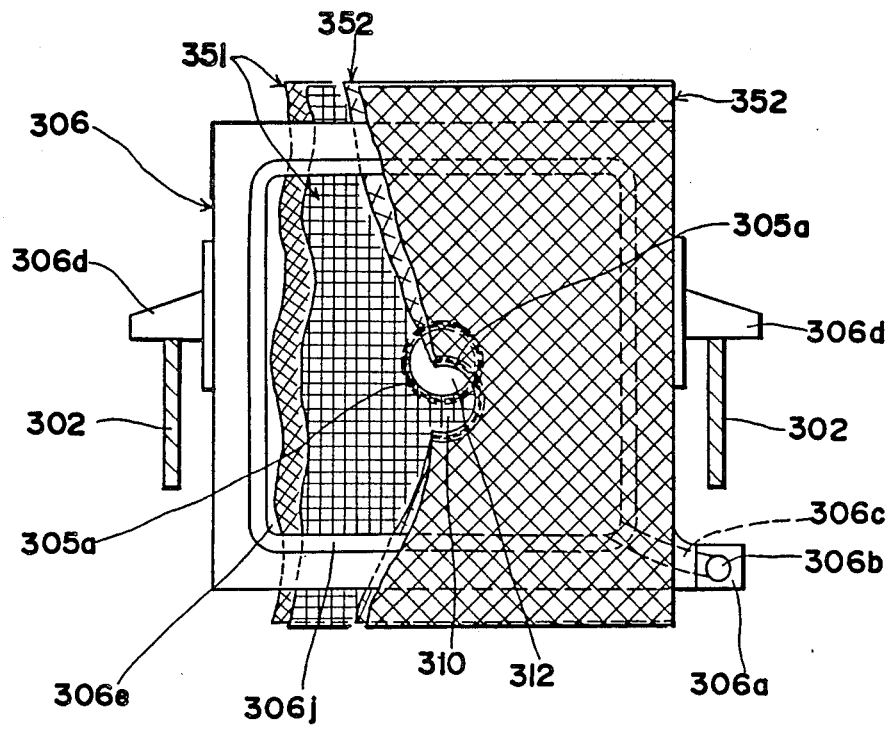
FIG. 31 is a fragmentary front view showing the location of the raw liquid supply port on a pair of filter cloths between the adjoining filter plates.

Each filter cloth 305 is located on front and rear sides of each filter plate 306 so that a pair of filter cloths 305 cover the space 306e in the filter plate 306. A raw liquid supply port 305a is formed substantially in the center of each filter cloth which corresponds to the filtering portion in the frame of each filter plate 306. The raw liquid supply ports 305a in facing filter cloths 305 between adjacent filter plates are staggered in their position between the facing filter cloths 351, 352, as shown in FIG. 31. These raw liquid supply ports 305a are staggered so as to partially confront each other at a position indicated by 312. Meanwhile, the portion 310 faces the adjoining filter cloth 352 itself. The portion 310 of the filter cloth of the raw liquid supply port 305a is preferably larger than the communication portion 312 since the portion 310 has to receive the supplied raw liquid from the raw liquid port in the neighboring the filter cloth so that the gap between the filter cloths 351 and 352 can be widened. The peripheries of the raw liquid supply ports 305a of each pair of filter cloths 351, 351: 352, 352 is seamed together so that the raw liquid may not enter between the adjacent filter cloths 351 and 352. The raw liquid supply port 305a can be formed by a pair of eyelet fixtures which are engaged with each other to make a through hole through each pair of filter cloths 351, 351: 352, 352. liquid supply ports 305a are in various position are located between front and rear stands. That is to say, from the side of the front stand in FIG. 30, a first filter cloth 351 whose raw liquid supply port 305a is in the same position as a raw liquid supply tube 301a of the front stand 301 is located at the back of front stand 301. The raw liquid supply port in a subsequential pair of filter cloth is positioned lower than the raw liquid supply port 305a of the first filter cloth 351. The raw liquid supply ports 305a of next pair of filter cloths 351 are in the same position as the above-described raw liquid supply tube 301a. That is to say, a pair of filter cloths 351 and another pair of filter cloths 352 are alternately located between the front and rear stands. Thus, the raw liquid supply ports 305a of the filter cloths align horizontally at their communicating portions 312.

According to the above embodiment, the raw liquid can be surely supplied into the filter chamber between the filter cloths 305, 305 since each filter plate 306 comprises only a frame, and the raw liquid which passes the raw liquid supply port 305a presses the periphery of the raw liquid supply port in the adjoining filter cloth 305 to forcefully widen the gap between the filter cloths 305 of the facing filter plates 306.

Consequently, there will not be such cases where the raw liquid is not supplied into the filter chamber 309 for such reason that the periphery of the raw liquid supply ports 305a of a pair of filter cloths 305, 305 between the adjoining filter plates 306, 306 are stuck together by a cake. Thus, the filtering area will not decrease, improving the filtering efficiency. Also, because the raw liquid fills each filter chamber to forcefully widen the gap between the facing filter cloths 305, 305 with raw liquid supply pressure, the raw liquid is supplied smoothly into each filter chamber 309, resulting in uniform filtering in each filter chamber Therefore, the dewatering efficiency in each filter chamber is effected uniformly Furthermore, a filter plate 306 can be much lighter than conventional ones which have filter floor inside the frame, because it comprises only a frame having a space therein.

Above fifth embodiment can be variously modified.

Figure 32:
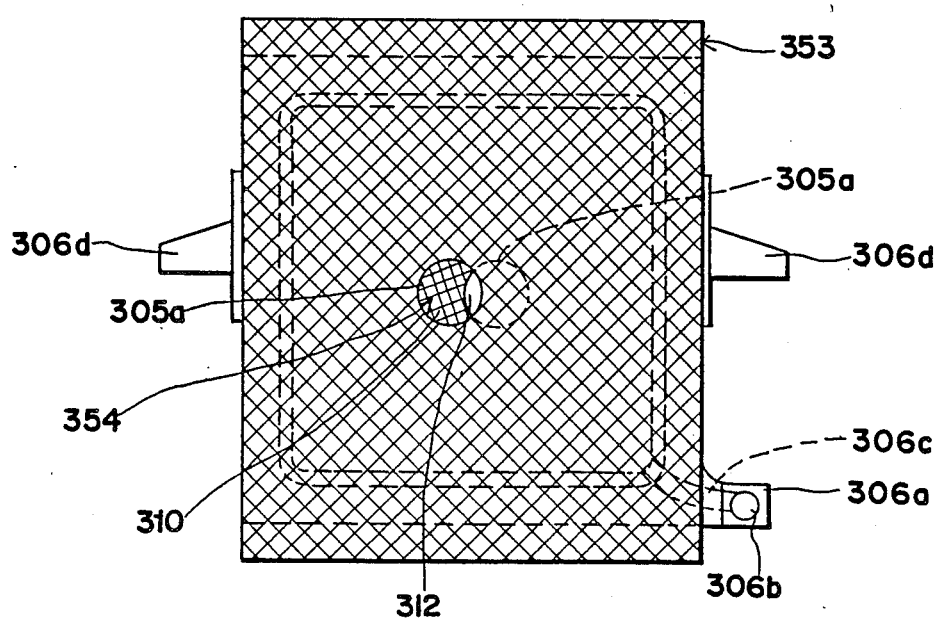
FIG. 32 is a front view showing the location of the raw liquid supply port on the filter cloth according to a modification of the fifth embodiment.

For example, in the above embodiment, the position of raw liquid supply ports 305a in a pair of filter cloths 305 between the adjoining filter plates 306 need not be staggered up and down; they may be staggered right and left, as shown in FIG. 32.

Figure 33:
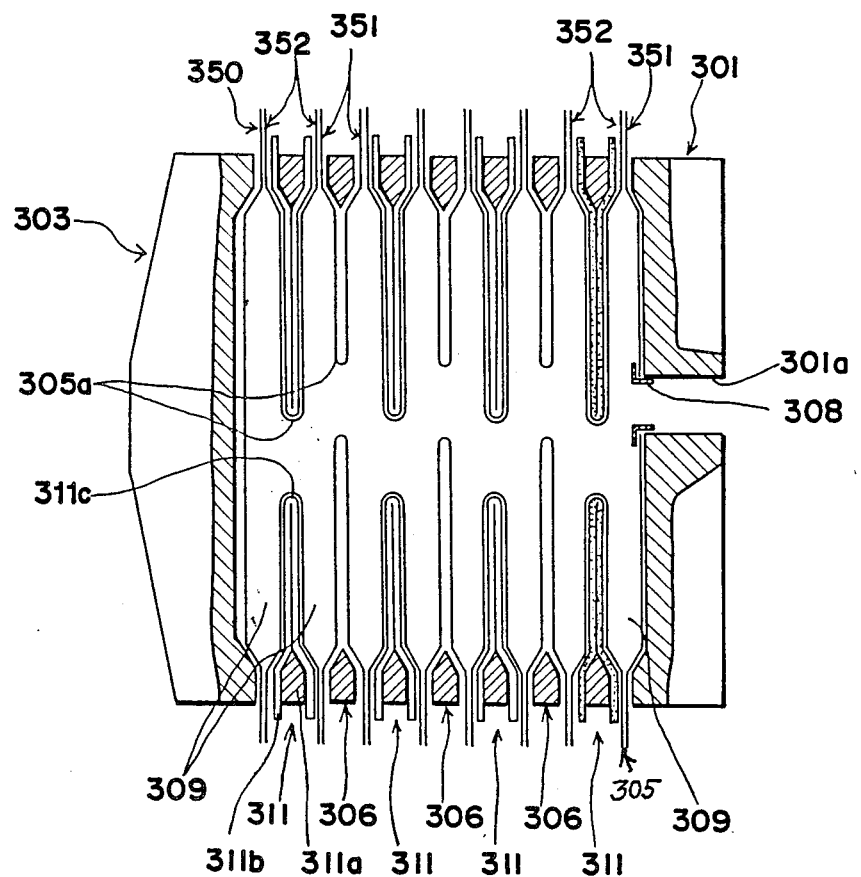
FIGS. 33 and 34 are, respectively, side elevations, partially in cross section, showing a filter press according to other modifications.

Also, as shown in FIG. 33, one of a pair of filter plates 306 may be replaced by a compression filter plate 311 of the filter press in FIG. 30. Each compression filter plate 311 comprises compression filter plate body 311a whose configuration is the same as the filter plate 306 described above, and the front and rear surfaces of said compression filter plate 311a is covered by elastic compression diaphragms 311b. A raw liquid supply port 311c is formed at a certain location of the compression diaphragms 311b. Its function may be the same as the raw liquid supply port 305a in the filter cloth 305.

Each raw liquid supply port may be staggered widely not to make any communicating portion 312 in the raw liquid supply port 305a.

The raw liquid may be supplied not only from the raw liquid supply tube 301a on the front stand 301. A raw liquid supply tube may be also formed on the movable plate 303. The raw liquid may be supplied from the raw liquid supply tube on the movable plate or from both of said raw liquid supply tubes. Furthermore, it may be supplied from the center filter plate 306 to both sides, the front stand 301 and the movable plate 303.

As shown by filter cloths 370 and 371, interposed between the adjacent filter plates 306 near the movable plate, the diameter of each raw liquid supply port 305a is gradually formed smaller as it proceeds from the raw liquid supplying side, i.e., the front stand side to the movable plate side so that a part of the raw liquid which has passed from the first filter chamber 309 through the raw liquid supply ports 305a in the filter cloths 370 to the next raw liquid supply ports 305a of the filter cloths 371 may strike the periphery of the raw liquid supply port 305a, 305a in the filter cloths 371 because of the diameter difference between the former raw liquid supply port 305a and the latter raw liquid supply port 305a forcefully widening the gap between the filter cloth 370 and 371 which from the second filter chamber 309 and surely supplying the raw liquid into the filter chamber 309.

Figure 34:
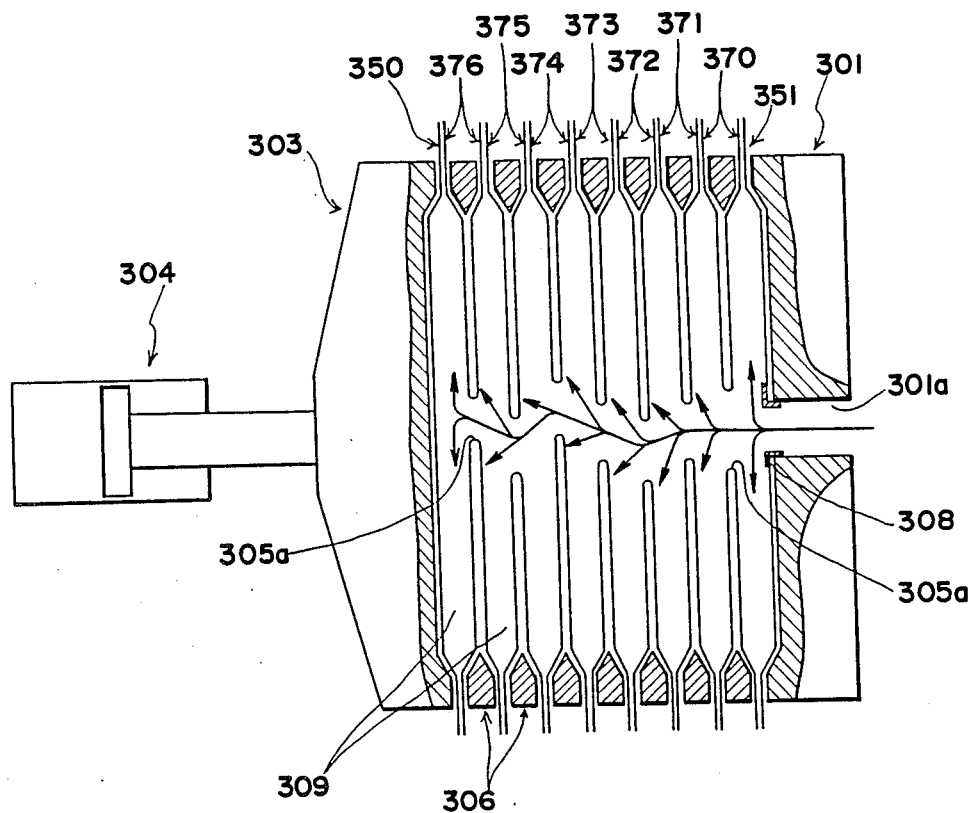

Also, as shown by the filter cloths 372 through 376 on other filter plates 306 in the same FIG. 34, the location of the raw liquid supply port 305a is shifted graduately upwardly from the filter cloth 372 toward the filter cloth 374, while it is shifted downwardly at the filter cloth 375 from the filter cloth 374; further on the filter cloth 376, it is shifted upwardly from the filter cloth 375. In this arrangement, the raw liquid striking portions 310 are formed lengthwise in the same way as in the above embodiment among the filter cloths 372, 373, 374. However, the whole of the supply area of the raw liquid supply port 305a, 305a communicates obliquely upwardly, ensuring the raw liquid supply into each filter chamber 309.

Embodiment 6

FIG. 35 through 42 show a sixth embodiment, wherein the support construction for the filter cloth can be simplified.

Generally, filter cloths for a filter press are located between adjacent filter plates. The support construction for filter cloth is of various types. According to one typical support construction, on the upper and lower portions of a filter plate are mounted filter cloth hanging rods between which a filter cloth is set up. The lower filter cloth hanging rod is secured between a pair of brackets extended downwardly from both bottom sides of the filter plate. Both ends of the upper filter cloth hanging rod are hung from fixing support members such as brackets by means of a resilient means such as springs so that the filter cloth is stretched. When an upper filter cloth hanging rod is not used, on both upper ends of a filter cloth are mounted fitting means which connect the resilient means such as springs.

Meanwhile, the amount of weight which the resilient means such as springs supports includes the weight of a filter cloth hanging rods or that of fitting means. However, originally, a filter cloth only must be supported in the construction. In this regard, a filter cloth hanging rod is an accessory component which may cause complicated construction.

The sixth embodiment is developed to effectively solve the above problems of the prior art. The object of the sixth embodiment is to provide a filter cloth in which the filter cloth supporting construction can be simplified and its weight can be lightened.

To solve the problems of the prior art and achieve the above object, a filter cloth according to the sixth embodiment comprises a hanging means formed by cord members which is mounted to both sides of the upper end of a filter cloth. The cord members may consist of tape-shaped cloths, ropes, straps with woven reinforcement material, cords made of cloth, synthetic resin or leather, covering material made of fine wires, etc. It is desirable to sew a reinforcement pad on the filter cloth between the pair of hanging means.

With a filter cloth according to the sixth embodiment, lightening and simplification of the filter cloth supporting construction is possible since heavier accessory components such as filter cloth hanging rods and fitting means are not required because the hanging means formed by cord members is directly mounted to the filter cloth.

The sixth embodiment will be described in detail herebelow with reference to FIGS. 35 to 42.

Figure 35:
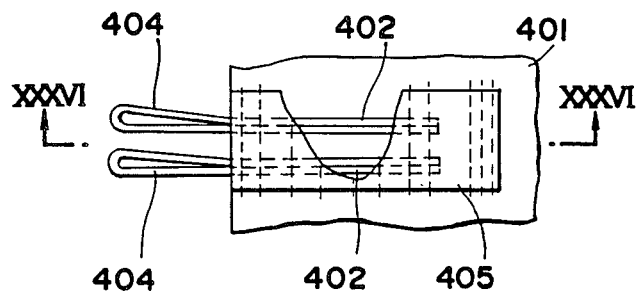
FIG. 35 is a fragmentary plan view showing an essential part of a filter cloth, to which the hanging means are mounted, according to a sixth embodiment of the present invention.
Figure 36:
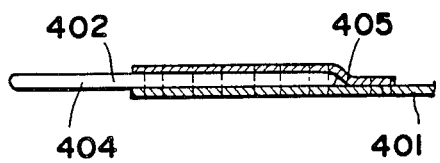
FIG. 36 is a cross sectional view along a line XXXVI—XXXVI in FIG. 35.
Figure 37:
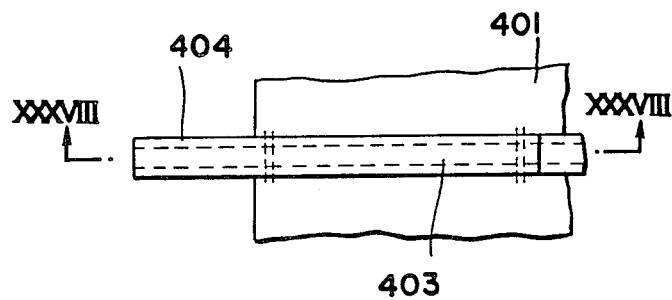
FIG. 37 is a fragmentary plan view similar to FIG. 35, showing a modification of the sixth embodiment.
Figure 38:
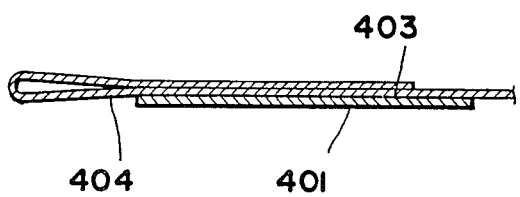
FIG. 38 is a cross sectional view along a line XXXVIII—XXXVIII in FIG. 37.
Figure 39:
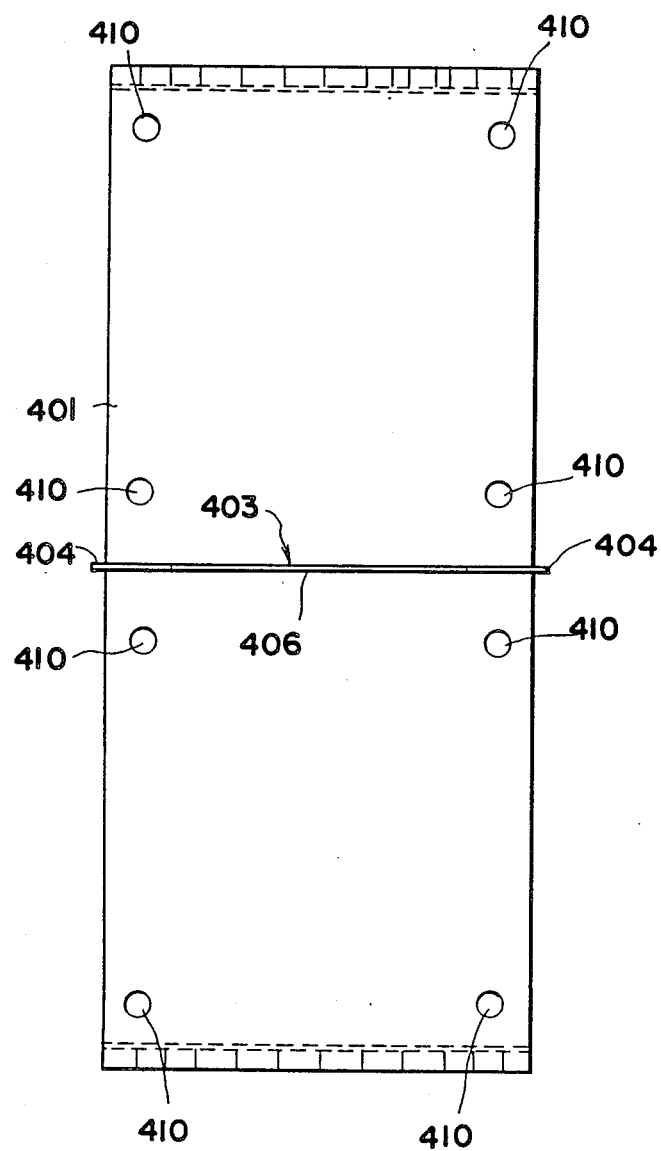
FIG. 39 is a developed front view of a filter cloth as shown in FIGS. 37 and 38.

FIG. 35 is a fragmentary plan view showing an essential part of a filter cloth to which hanging means are mounted. FIG. 36 is a cross section taken along a line XXXVI—XXXVI in FIG. 35. FIG. 37 is a fragmentary plan view similar to FIG. 35, showing a modification of the sixth embodiment. FIG. 38 is a cross section taken along a line XXXVIII—XXXVIII in FIG. 37. FIG. 39 is a developed front view of a filter cloth as shown in FIGS. 37 and 38. A filter cloth 401 in FIG. 39, whose structure is the same as that of a filter cloth 401 of the embodiment in FIGS. 35 and 36 except for tape members 403 which form the hanging means, is double-folded at its center so that its longer edges are divided into halves. The filter cloth 401 is placed over both sides, front and rear, of a filter plate (not shown in the figure) with the folded part being upward. Holes 410 located at four corners of each half of the filter cloth are, respectively, raw liquid supply ports corresponding to filtrate ports of the filter plate.

In the embodiment as shown in FIGS. 35 and 36, on both of the upper end sides of the filter cloth, each of two cord members 402 is double-folded, and the folded part is constructed as the hanging means in a loop portion 404. This loop portion 404 is arranged so that it may protrude from both sides of the filter cloth 401, and in this condition, a reinforcement pad 405 is placed on the filter cloth with cord members 402 interposed. The pad and the cord members are directly sewed to the filter cloth 401.

In the modification as shown in FIGS. 37 to 39, on the upper end of the double-folded filter cloth 401, a tape member which is longer than the entire width of the filter cloth 401 is sewed on the filter cloth 401 with both ends extending outwardly. Subsequently, these ends are folded to form a loop portion 404 as the hanging means. In this case, the part of a tape member 406 between both of the loop portions 404 thereof is also sewed on the filter cloth 401, thus constructing a reinforcement pad for the filter cloth 401. In the embodiment as shown in FIGS. 35 and 36, a reinforcement pad may be sewed on the filter cloth between each of the above described pads 405.

Figure 40:
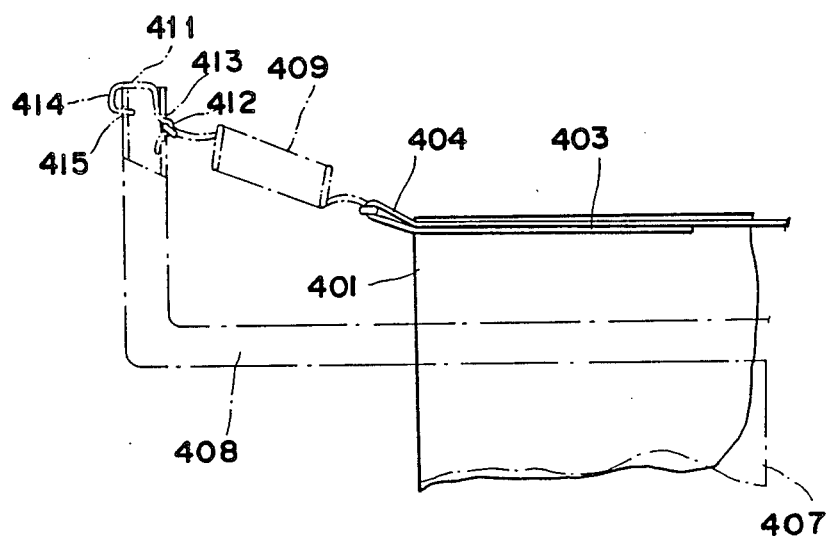
FIG. 40 is an illustration of the filter cloth supporting construction according to the modification as shown in FIGS. 37 to 39.
Figure 41:
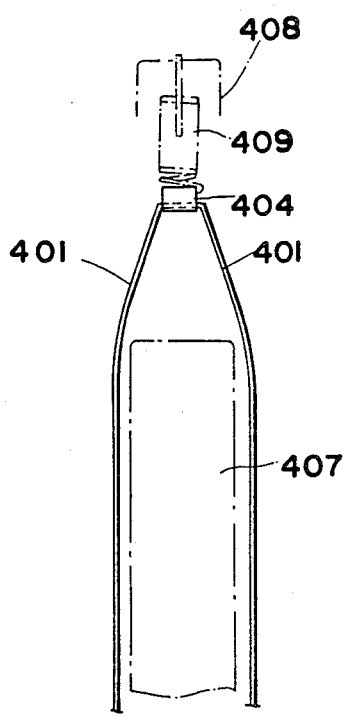
FIG. 41 is an illustration of FIG. 40 showing a left side elevation.
Figure 42:
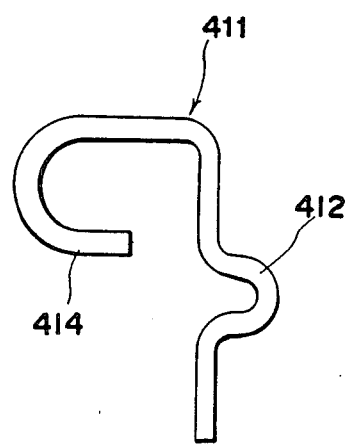
FIG. 42 is a front view of a support metal piece used for mounting the coil spring onto the bracket.

FIG. 40 is an illustration of the filter cloth supporting construction according to the modification. FIG. 41 is an illustration of FIG. 40 showing a left side view. In each figure, filter plates, brackets, and coil springs acting as resilient means are shown by dashes and dotted lines. As shown in the figures, one end of a coil spring 409 is hung from the end of a bracket 408 which is fixed at the upper end of a filter plate 407. The other end of each coil spring 409 is engaged with the loop portion 404. The coil spring 409 is mounted onto the bracket 408 so as to pull the filter cloth 401 upward and to both sides. A support metal piece 411 whose shape is shown in FIG. 42 is used as a mounting fixture for the coil spring 409 and the bracket 408. This support metal piece 411 can be easily attached on the bracket 408. Namely, a hook portion 412 of the piece 411 projects out through an opening 413 formed in the bracket 408, and a bracket hanging portion 414 of the piece 411 is engaged with a retaining hole 415 formed in the bracket 408. Also, removal operation can be easily performed. Once the coil spring 409 is hooked, it will remain secured.

The filter cloth 401, as above constructed, is convenient because it can be immediately mounted on spring members for use and without the filter cloth hanging rod. Strong springs are not required as the weight the spring members support becomes lighter. If a slight lateral movement of the filter cloth is permitted, the cord members can be extended between the pair of spring members to hang the filter cloth.

Embodiment 7

FIGS. 43 to 56 show a seventh embodiment which provides an improvement of the support construction of the filter plate.

According to a prior art filter press, a bracket protruding in a depthwise direction of the filter plate is fixed to each of both sides of a rectangular plate-shaped filter plate. A pair of these brackets are hung from and supported by a pair of guide rails which are installed between the front and rear stands. The brackets of each filter plate are guided along the guide rails with the aid of a filter plate drive, thereby forcing each filter plate to move forwardly and backwardly along the guide rails.

There has recently been a trend toward a change in the construction material of the filter plate from metal to a synthetic resin, and also a trend toward gradually decreasing the thickness of the filter plate itself in response to a demand for lightweight filter plates. A filter plate possessing such a lightweight and small plate thickness has the disadvantages that the bracket cannot be securely fixed to each side thereof from the viewpoint of strength.

Accordingly, an essential object of the seventh embodiment is to solve the above-described problem and to provide a filter plate for a filter press which can securely posses hanging and support members, even if the filter plate is light in weight and small in thickness.

To accomplish the above-described object, according to the seventh embodiment, there is provided a support bar on the outer surface of a filter plate; the support bar being slidably engaged with guide rails, thereby hanging and supporting the filter body. That is, a filter plate for a filter press according to the seventh embodiment is so constructed as to be equipped with a filter plate, hanging and support members, which are provided on the outer surface of the filter plate and hang and support the filter plate by slidably engaging with the guide rails therealong, and connecting fittings which connect the hanging and support members to the filter plate.

According to the above-described construction, the filter press is so constructed that the filter plate is hung from and supported by the support bar by means of the connecting fittings through which the filter plate is hung from and supported by the guide rails. When the filter plate is to be moved, the filter plate drive move each support bar along the guide rails, thus forcing the filter plate connected to the support bar to move along the guide rails.

According to the above-described construction, the filter plate is so constructed that the filter plate is hung and supported by means of the connecting fittings from the hanging and support member provided on the outer surface of the filter plate, wherein the hanging and support member is slidably engaged with the guide rails and is moved forwardly and backwardly by hand or, for instance, by means of the filter plate drive, thereby each filter plate is guided along the guide rails in the forward and backward directions, which dispenses with the need for fixing the bracket to the side of the filter plate. Consequently, even in the case of lightweight and narrow-thickness filter plates made from synthetic resin, to say nothing of the heavier and thicken conventional ones, the filter body can be securely hung from and supported by the guide rails by means of the hanging and support member, which also serves as a guiding protrusion for conveying the filter plate. Therefore, there is no need to consider the required strength for fixing the bracket, which in turn allows a broader choice of construction materials for the lightweight frame body, for instance, light metal.

Figure 43:
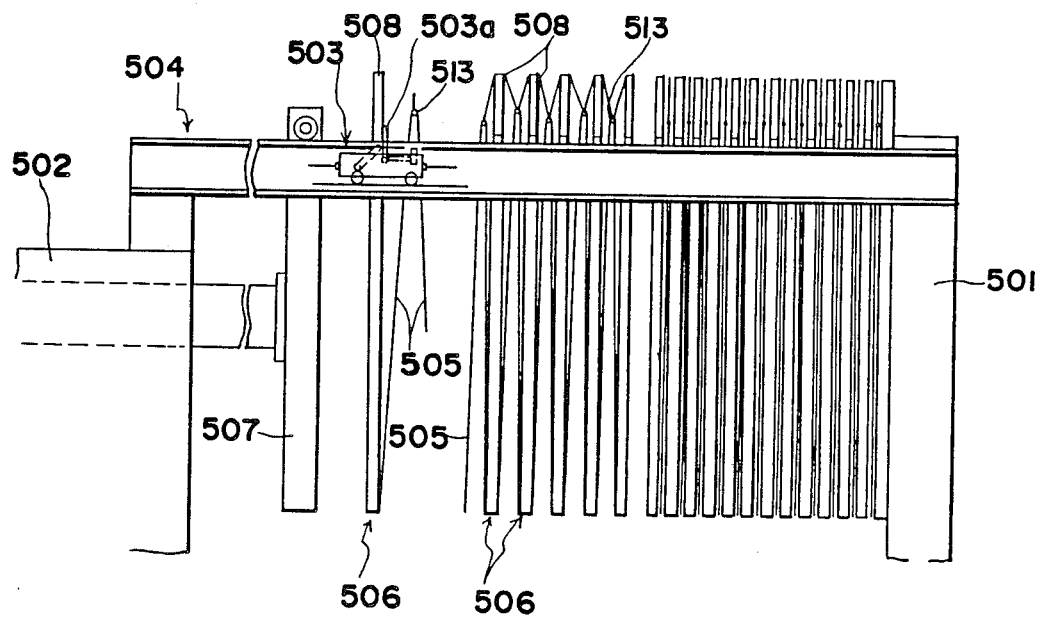
FIG. 43 is a side elevation of a filter press according to a seventh embodiment of the present invention in which a number of filter plates are arranged.
Figure 44:
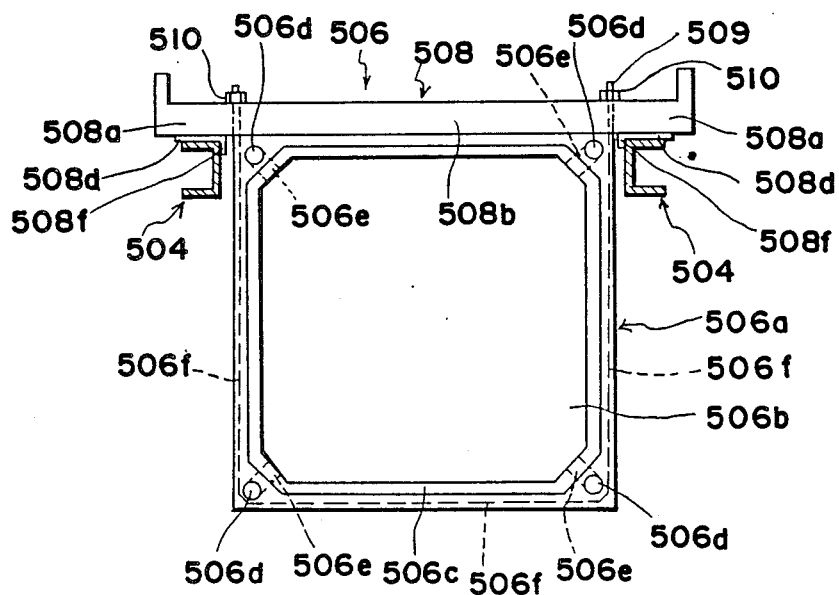
FIG. 44 is a top plan view of a filter plate.
Figure 45:
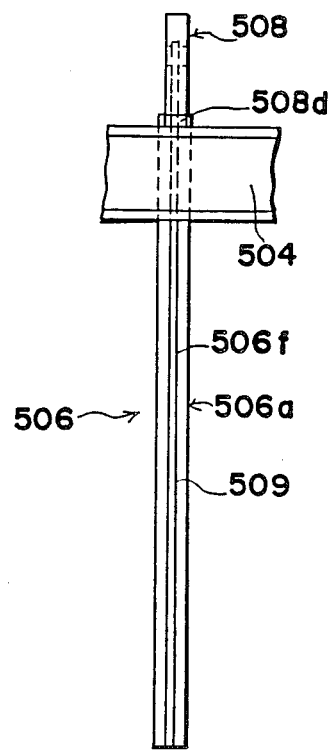
FIG. 45 is a side view of the filter plate hung from and supported by a guide rail.
Figure 46:
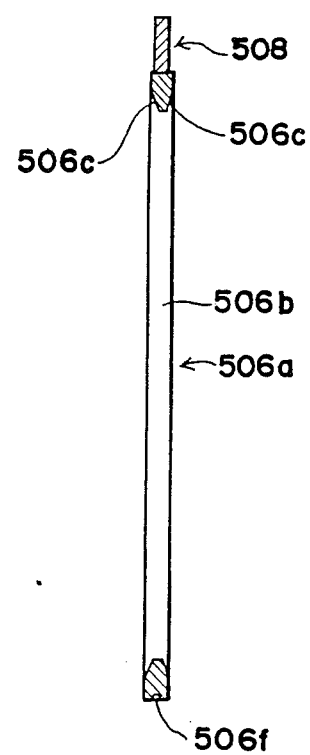
FIG. 46 is a longitudinal sectional view of the filter plate.

Referring to FIG. 43–FIG. 56, the seventh embodiment is described in detail hereinafter:

A filter press according to the seventh embodiment, as shown in FIG. 43 and FIG. 44, guide rails 504 which are installed between a front stand 501 and a rear stand 502 and are respectively installed on each of both sides of the stands 501, between which a number of filter plates 506 are arranged and are forwardly and backwardly movably hung from and supported by the guide rails 504, and a pair of filter cloths 505 being so arranged as to be positioned between the adjacent filter plates 506. When a movable plate 507, arranged at the back of the filter plate 506 located at the rear end, is moved forwardly by means of a drive, the filter plates 506 are all forcibly pressed toward the front stand. A raw liquid is fed from the front stand 501 into each filter chamber (not shown) between a pair of filter cloths 505 and 505, and is subjected to filtering, and thus the raw liquid is separated into a cake and a filtrate. On completion of filtering, the movable plate 507 is moved backwardly, and each filter plate 506 is moved one by one toward the rear stand by means of a filter plate drive 503 provided on the guide rails 504; thus the adjacent filter plates 506 are opened and a cake which remains between a pair of the filter cloths 505 is peeled off. Each filter plate 506, as shown in FIG. 44–FIG. 46, approximately comprises a rectangular filter frame 506a which forms an approximately square-shaped filtering space 506b at the center, a support bar 508 which is arranged on the upper end of the filter frame 506a, and a wire 509 which is a kind of a cord-shaped member used as connecting fittings for connecting the support bar 508 to the filter frame 506a.

The frame 506a has slopes, i.e., slanting surfaces 506c, on the internal surface thereof, which begin to slant from the center of the depthwise direction toward both the front and rear sides. On the outer surfaces of both sides and the bottom of each filter frame 506a are formed concave grooves 506f, which communicate from the upper end of one side through the bottom to the upper end of another side of each filter frame 506a. At the corners of each filter frame 506a are provided triangular-shaped extended portions which extend toward the foregoing space side, thereon being formed through holes 506d, which pass through in the filter plate depthwise direction, and communicating holes 506e, which are in communication between the through holes 506d and the space 506b.

On the other hand, the support bar 508 is rectangular in section having a smaller thickness than the filter frame 506a, and having a larger width than the filter frame 506a, in a direction intersecting at right angles the depthwise direction, i.e., the widthwise direction; an intermediate portion 508b being positioned on the upper outer surface of the filter frame 506a. Both sides thereof respectively project beyond each side of the filter frame 506a, thus forming a projection 508a. On the lower surface of each projection 508a is fixed an L-shaped sliding member 508d, which is positioned on each guide rail 504 for guiding the forward and backward sliding of the filter plate 506. A protrusion 508f of the sliding member 508d is contacted by the internal surface of the guide rail 504 so as to prevent the filter plate 506 from sliding away from the guide rails 504 in the widthwise direction. Between each side of the supports 508 for the filter plates 506, and between the lower portions of the adjacent filter frame 506a may be mounted by known connecting rings (not shown) so as to allow all the filter plates to be simultaneously opened. The support bar 508 may have the same thickness as that of the filter frame 506a.

Figure 47:
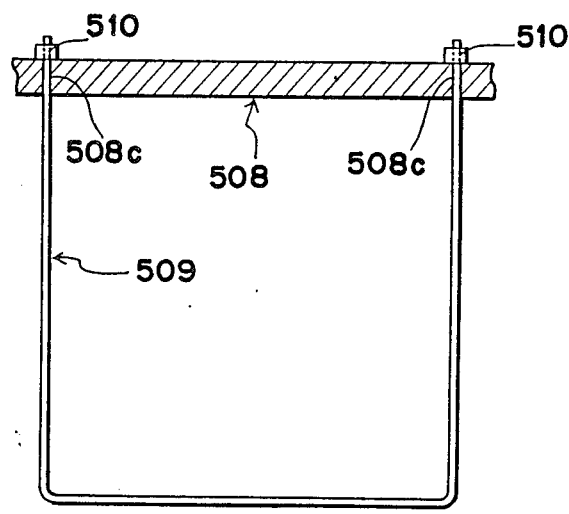
FIG. 47 is an illustration showing the relationship between a support bar and a wire.
Figure 48:
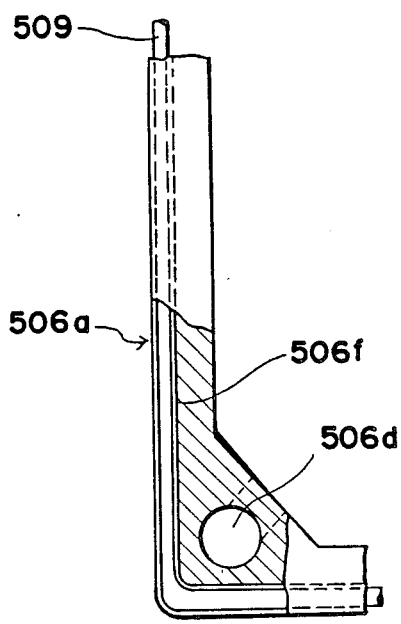
FIG. 48 is a fragmentary front elevation of the lower portion of a fifth frame.
Figure 49:
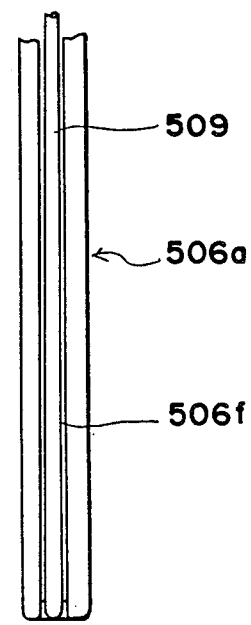
FIG. 49 is a side elevation of an essential portion of the frame body.

Further, the wire 509, which is made from metal, nylon, etc., as shown in FIG. 47–FIG. 49, passes downward through a through hole 508c near to one projection of the support bar 508, then passes through a concave groove 506f on one side of the filter frame 506a, a concave groove 506f on the bottom thereof and a concave groove 506f on another side thereof, then passes through a through hole 508c near to another projection of the support bar 508, and projects upwardly from the support bar; thus the wire 509 is formed in an approximate U-shape. Wire fastening rings 510 are inserted into both ends of the wire 509 which projects upwardly from both through holes 508c perforated in the foregoing support bar 508. The filter frame 506a is firmly fastened to the support bar 508 by means of the wire 509 so as to allow the support bar 508 and the filter frame 506a to integrally move, whereas each projection 508a of the support bar 508 is hung from and supported by the guide rail 504 so that the guide rail 504 hangs and supports the filter frame 506a.

Each filter cloth 505 is hung from and supported by a cloth hanging rod 513 in front of and behind each filter plate 506 in such a way that the internal space 506b of the filter plate 506 is positioned between a pair of these filter cloths 505.

According to the above-described construction, the filter plate 506 is so constructed that the filter frame 506a is integrally and firmly fastened by means of the wire 509 to the support bar 508, both ends of the wire being fixed by means of the fastening rings 510, and each projection 508a of the support bar 508 for this filter plate 506 being slidably engaged with each guide rail 504 which is installed between the front and rear stands 501 and 502; thus each filter plate 506 being hung therefrom and supported thereby.

The operation of the above filter press is as follows; that is, the movable plate 503 is moved forwardly so that all the filter plates 506 are forcibly pressed toward the front stand side and thus are closed, and filtering is then performed by feeding a raw liquid into a filter chamber between a pair of the filter cloths 505 between the adjacent filter plates 506 and 506 beginning from, for example, the front stand 501 side. This filtering allows the raw liquid to separate into a cake and a filtrate with the cake being secured between a pair of the filter cloths 505 and the filtrate being flowed downwardly along the filter cloth 505 through the communicating hole 506e and recovered in the through hole 506d. Once the first filtering process is completed, the movable plate 507 is moved backwardly and each filter plate drive 503, provided on each guide rail 504, is then driven so as to send backwardly each projection 508a of the support bar 508 for each filter plate 506; thus the filter plates 506 are forcibly moved backwardly one by one and the adjacent filter plates 506 are opened, thereby allowing the recovery of the cake secured in a pair of the filter cloths 505 between the filter plates 506, hence allowing preparation for subsequent filtering.

According to the above-described embodiment, the filter plate 506 is so constructed that the filter frame 506a is hung and supported through the wire 509 from and by the support bar 508 arranged on the upper portion of the frame 506a, and the filter plate drive 503 forces each projection 508a of the support bar 508 to move forwardly and backwardly; thereby, each filter plate 506 is guided along the guide rails in the forward and backward directions, which dispenses with the need for fixing a bracket to the side of the filter frame 506a, allowing the support bar 508 to hang and support the filter plate 506, lighter in weight and narrow in thickness and made of synthetic resin, from the guide rails 504, and further, the projection 508a of the support bar 508 also serves as a guiding protrusion for conveying the filter plate, thereby the filter plate 506 is securely guided along the guide rails. Consequently, there is no need to consider required strength for fixing the bracket, which in turn allows a broader range of materials to be employed, i.e., the filter frame 506a may be composed of lightweight material such as, for example, light metal. Further, the projection 508a of the support bar 508 projects laterally from the filter frame 506a and is positioned on the guide rail, thereby the filter plate 506 can be securely guided forwardly and backwardly along the guide rails by means of the filter plate drive 503. If the support bar 508 is formed by a metal plate, the support bar 508 can maintain adequate strength, even if substantially smaller in thickness as compared with that of the filter frame 506a, which in turn, when pressing the filter plates, allows wider spacing between the adjacent support bars 508. Thus, a feed claw 503a can be securely inserted into a space between the adjacent support bars 508 to convey the filter plates 506 one by one. The filter frame 506a is hung from and supported by the support bar 508 with the use of the wire 509, which is tightened by means of the fastening rings 510 and held to the support bar 508. Therefore, even if the wire 512 is elongated, the wire 512, when pulled upwardly, can return to its normal tension state with the aid of the foregoing fastening rings 510, allowing frequent retightening of the wire 512.

Figure 56:
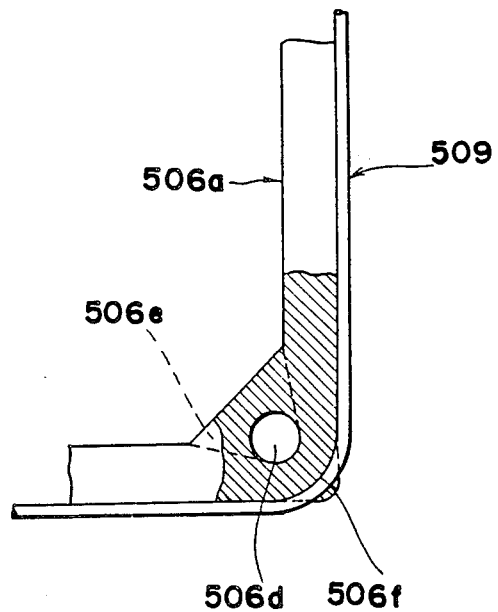

The seventh embodiment can be modified in various manner. For instance, the concave grooves 506f formed on the filter frame 506a may be formed only on the corners of the filter frame 506a, as shown in FIG. 56, not formed on both sides and bottom of the filter frame 506a.

Both ends of the support bar 508 may project upwardly from the filter frame 506a and bent into a reversed L-shape form instead of projecting beyond the width of the filter frame 506a; the guide rails 504 are arranged above the filter frame 506a; both bent ends of the support bar 508 are slidably engaged with the guide rails 504, thereby hanging and supporting the filter frame 506a.

Figure 50:
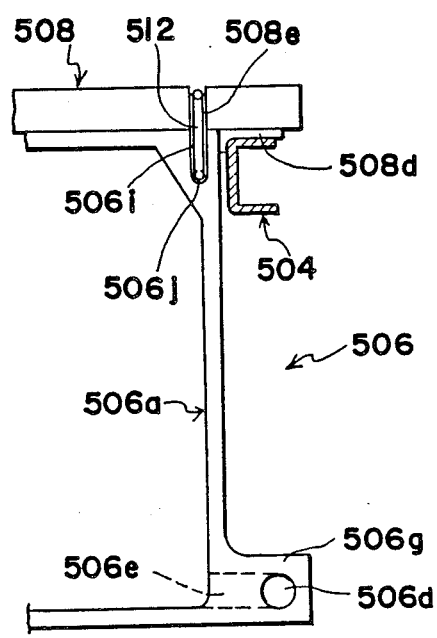
FIG. 50 is a front view of an essential portion of the filter plate according to a modification of the seventh embodiment.

Further, as shown in FIG. 50, concave portions 508e and 506i may be formed on the front and rear faces of the support bar 508 and on the front and rear faces of the filter frame 506a, respectively, and there may be formed a through hole 506j communicating between the lower ends of the concave portions on the front and rear faces of the filter frame 506a so that the wire 512 can be wound along each concave portion 508e and 506i of the filter frame 506a and support bar 508, and inserted into the through hole 506j and wound along each concave portion 506i and 508e of the rear faces of both the filter frame 506a and support bar 508, thus the filter frame 506a is suspended and supported by the support bar 508. In this case, the wire 512 can be short in length and the filter frame 506a with narrow thickness and low rigidity can be reinforced with the aid of the support bar 508, thereby twisting and other deformations of the frame 506a can be effectively prevented.

The connecting fitting is not limited to the cord-shaped member, and may be a fastening member such as a bolt.

The hanging support member, as shown in FIG. 52--FIG. 55, may be contacted by a hanging support frame 515 equipped with reversed L-shaped frames 515c and 515c, each of the projections 515a at the upper ends thereof being slidably engaged with each foregoing guide rail 504, and a bottom frame 515d which is in contact with the outer surface of the bottom of the filter frame 506a. A concave portion 515b is formed on the outer surface of each of frame 515c, 515d and 515c of this hanging and support frame 515, and the wire 509 is inserted into the concave portions 515b, thereby integrally connecting the filter frame 506a to the hanging frame 515, with both ends of the wire 509 being fastened by means of the fastening member 514. Rotation of this fastening member 514 forces both threaded ends of the wire 509 to move so as to approach each other. The end of the sliding member 508d may be extended outwardly; the dimension, in the depthwise direction, of this extended portion 508g is smaller than other portions so as to allow the feed claw 503a of the filter plate drive 503 to engage The above-described embodiment, of course, is applicable to a compression filter plate.

Figure 51:
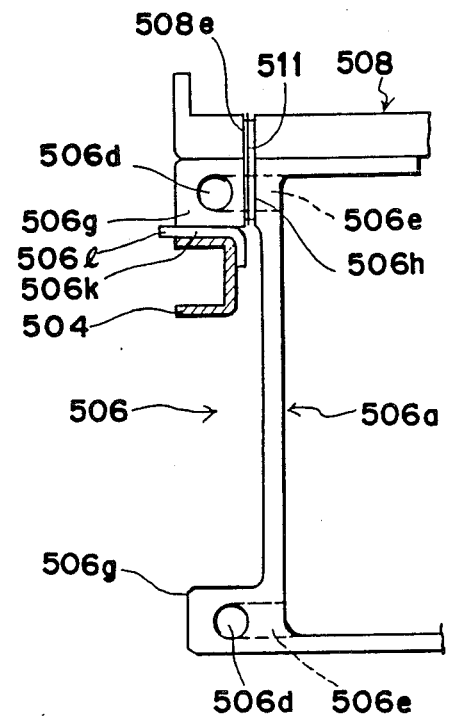
FIG. 51 is a front view of an essential portion of the filter plate according to yet another modification of the seventh embodiment.

As shown in FIG. 51, at each of the upper and lower corners of the side surface of the filter frame 506a, there may be integrally formed laterally-projected ear portions 506g, . . . , 506g, on each of which through hole 506e and communicating hole 506d are formed. On each of the lower surfaces of a pair of the upper ear portions 506g, there may be fixed a L-shaped sliding member 506k having the same function as that of the sliding member 508d, placing each ear portion 506g on the guide rail 504 through the sliding member 506k. The support bar 508 may be arranged on the top of the filter frame 506a with concave portions 506h being respectively formed on the front, lower and rear faces of a portion connecting the ear portion 506g to the filter frame 506a, concave portions 508e being respectively formed on the front and rear faces of the support bar 508 and the wire 509 being engagedly wound along each concave portion 506h and 508e; thus securing the filter frame 506a and hanging and supporting the filter frame 506a from and by the support bar 508. In FIG. 51, the end of the sliding member 506k may be extended laterally; the dimension, in the depthwise direction, of this extended portion 506e is smaller than other portions so as to allow the feed claw 503a of the filter plate drive 503 to engage and disengage with said extended portion 506e.

What is claimed is:
1. A filter press comprising:
a front stand and a rear stand in spaced opposed relation to each other;
a plurality of filter plates positioned between said strands, each of said filter plates consisting essentially of a filter frame in the shape of a closed geometric figure defining a space therewithin;
a pair of abutting filter cloths between each two adjacent filter plates with the filter plates in abutting relation and holding said filter cloths therebetween when said press is in filtering operating condition and defining a raw liquid chamber therebetween and defining within each filter frame a filtrate chamber;

means for feeling a raw liquid to be filtered to said raw liquid chamber;

means for leading filtrate out of said filtrate chambers; and a movable plate on said rear stand for pressing against and releasing pressure on said plurality of filter plates.

2. A filter press as claimed in claim 1, further comprising a pair of compression filter plates and a pressure receiving plate located between said front and rear strands and having some of said filter plates and pairs of filter cloths therebetween, each of said compression filter plates and said pressure receiving plate having a filter frame and a compression diaphragm covering the front and rear surfaces thereof.

3. A filter press as claimed in claim 1 further comprising a hanging means mounted on the upper end of each filter cloth for hanging said filter cloth on one of said filter plates.

4. A filter press as claimed in claim 1 further comprising a support bar for each of said filter plates and a filter frame hanging means for hanging the filter frame of the filter plate downwardly from said support bar.

5. A filter press comprising:

a front stand and a rear stand in spaced opposed relation to each other;

a plurality of filter plates positioned between said stands, each of said filter plates being a filter frame in the shape of a closed geometric figure defining a space therewithin for accomodating material to be filtered;

a pair of filtered cloths between each two adjacent filter plates with the filter plates in abutting relation to hold said filter cloths therebetween when said press is in filtering operating conditions; and a movable plate on said rear stand for pressing against and releasing pressure on said plurality of filter plates;

the filtering portion of said filter cloth defining the opposite sides of said spaces having a plurality of raw liquid supply ports therein, said raw liquid supply ports in the respective filter cloths of the pairs of filter cloths which are between adjacent filter plates being offset laterally of the direction between said front and rear stands.

6. A filter press as claimed in claim 5 in which said raw liquid supply ports in adjacent filter cloths are at least partly overlapped whereby there is an opening straight through the adjacent filter cloths having a size less than the size of said supply ports.

7. A filter press comprising:

a front stand and a rear stand in spaced opposed relation to each other;

a plurality of filter plates positioned between said stands, each of said filter plates consisting essentially of a filter frame in the shape of a closed geometric figure defining a space therewithin and a gap retaining member in said space;

a pair of abutting filter cloths between each two adjacent filter plates with the filter plates in abutting relation and holding said filter cloths therebetween when said press is in filtering operating condition and defining a raw liquid chamber therebetween and defining within each filter frame a filtrate chamber, said filter cloths having apertures therein joined around the peripheries thereof within the space in each filter frame for forming an opening between raw liquid chambers on opposite sides of each filtrate chamber for feeding raw liquid thereinto, said gap retaining member being between said filter cloths on opposite sides of each filtrate chamber for holding said filter cloths apart and causing the formation of a space between said filter cloths at the edges of said opening for providing easy access of the raw liquid to the raw liquid chambers;

means for leading filtrate out of said filtrate chambers; and a movable plate on said rear stand for pressing against and releasing pressure on said plurality of filter plates.

* * * * *